(12) United States Patent
Ghasemi Chaleshtari

(10) Patent No.: US 9,554,556 B2
(45) Date of Patent: Jan. 31, 2017

(54) APPARATUS AND METHOD FOR USING A TOILET AS A WATER SUPPLY FOR PETS

(76) Inventor: Mohammad Ghasemi Chaleshtari, Surrey (CA)

(*) Notice: Subject to any disclaimer, the term of this patent is extended or adjusted under 35 U.S.C. 154(b) by 0 days.

(21) Appl. No.: 13/983,277

(22) PCT Filed: Dec. 9, 2011

(86) PCT No.: PCT/CA2011/001352
§ 371 (c)(1),
(2), (4) Date: Aug. 22, 2013

(87) PCT Pub. No.: WO2012/113052
PCT Pub. Date: Aug. 30, 2012

(65) Prior Publication Data
US 2013/0319339 A1    Dec. 5, 2013

Related U.S. Application Data

(60) Provisional application No. 61/445,887, filed on Feb. 23, 2011, provisional application No. 61/497,680, filed on Jun. 16, 2011.

(51) Int. Cl.
*A01K 7/02* (2006.01)
*A01K 7/06* (2006.01)
(Continued)

(52) U.S. Cl.
CPC . *A01K 7/06* (2013.01); *A01K 7/00* (2013.01); *A01K 7/02* (2013.01); *E03D 1/003* (2013.01)

(58) Field of Classification Search
CPC ........ A01K 39/02; A01K 39/024; A01K 7/00; A01K 7/02; A01K 7/025; A01K 7/024
(Continued)

(56) References Cited

U.S. PATENT DOCUMENTS 363,494 A     5/1887  White et al.
2,545,338 A   1/1946  Bowden
(Continued)

FOREIGN PATENT DOCUMENTS

CN    201422313        3/2010
DE    102009018324 A1  11/2010
(Continued)

OTHER PUBLICATIONS

International Search Report for PCT/CA2011/001352 dated Mar. 14, 2012.
(Continued)

*Primary Examiner* — Lisa Tsang
(74) *Attorney, Agent, or Firm* — Bruce M. Green; Oyen Wiggs Green & Mutala LLP

(57) ABSTRACT

An automatically refreshed water supply for pets is provided by diverting the water from the water supply of a toilet to a water dispenser accessible to the pet and returning excess water to the toilet. The water is diverted from the flush cycle of a toilet to an exterior dish which fills to a predetermined level and then overflows over the edge of the dish and then by way of channels into the toilet, retaining the water after the flush cycle is completed. Alternatively a mechanism can be provided for triggering the replacement water flow by sensing of the motion or weight of the pet. The system can be pet-triggered for the toilet flush and/or flow of replacement water to the pet dish, or continuous water flow as long as the pet is detected.

19 Claims, 40 Drawing Sheets

(51) Int. Cl.
  *A01K 7/00* (2006.01)
  *E03D 1/00* (2006.01)

(58) Field of Classification Search
  USPC .......... 119/72, 74, 78, 79, 162; 47/59 R, 33,
      47/65.9, 66.1, 66.5, 66.6, 79, 39, 48.5;
      4/674, 4/679
  See application file for complete search history.

(56) References Cited

U.S. PATENT DOCUMENTS

| | | |
|---|---|---|
| 3,015,827 A | 1/1962 | Iwata |
| 3,428,964 A | 2/1969 | Lucas |
| 3,656,457 A | 4/1972 | Houston |
| 3,696,448 A * | 10/1972 | Carfora .................. E03D 1/003 4/295 |
| 3,995,327 A * | 12/1976 | Hendrick .......................... 4/363 |
| 4,646,780 A | 3/1987 | Spooner |
| 5,228,152 A | 7/1993 | Fraley |
| 5,522,096 A | 6/1996 | Brown |
| 5,799,609 A | 9/1998 | Burns et al. |
| 6,101,977 A | 8/2000 | Matz |
| 6,182,306 B1 | 2/2001 | Han |
| 6,205,950 B1 | 3/2001 | Thompson, Jr. |
| 6,253,709 B1 | 7/2001 | King |
| 6,425,148 B1 * | 7/2002 | Chen ................................ 4/665 |
| 6,446,576 B1 | 9/2002 | King |
| 6,823,537 B1 | 11/2004 | Cummings, III |
| 7,409,924 B2 | 8/2008 | Kates |
| 2009/0288246 A1 * | 11/2009 | Sanaghan, Jr. .................. 4/415 |
| 2010/0300366 A1 * | 12/2010 | Lipscomb et al. .............. 119/74 |

FOREIGN PATENT DOCUMENTS

| | | |
|---|---|---|
| GB | 708720 | 5/1954 |
| GB | 2264725 A | 9/1993 |

OTHER PUBLICATIONS

English Machine Translation for DE 102009018324.
English Machine Translation for CN 201422313.

* cited by examiner

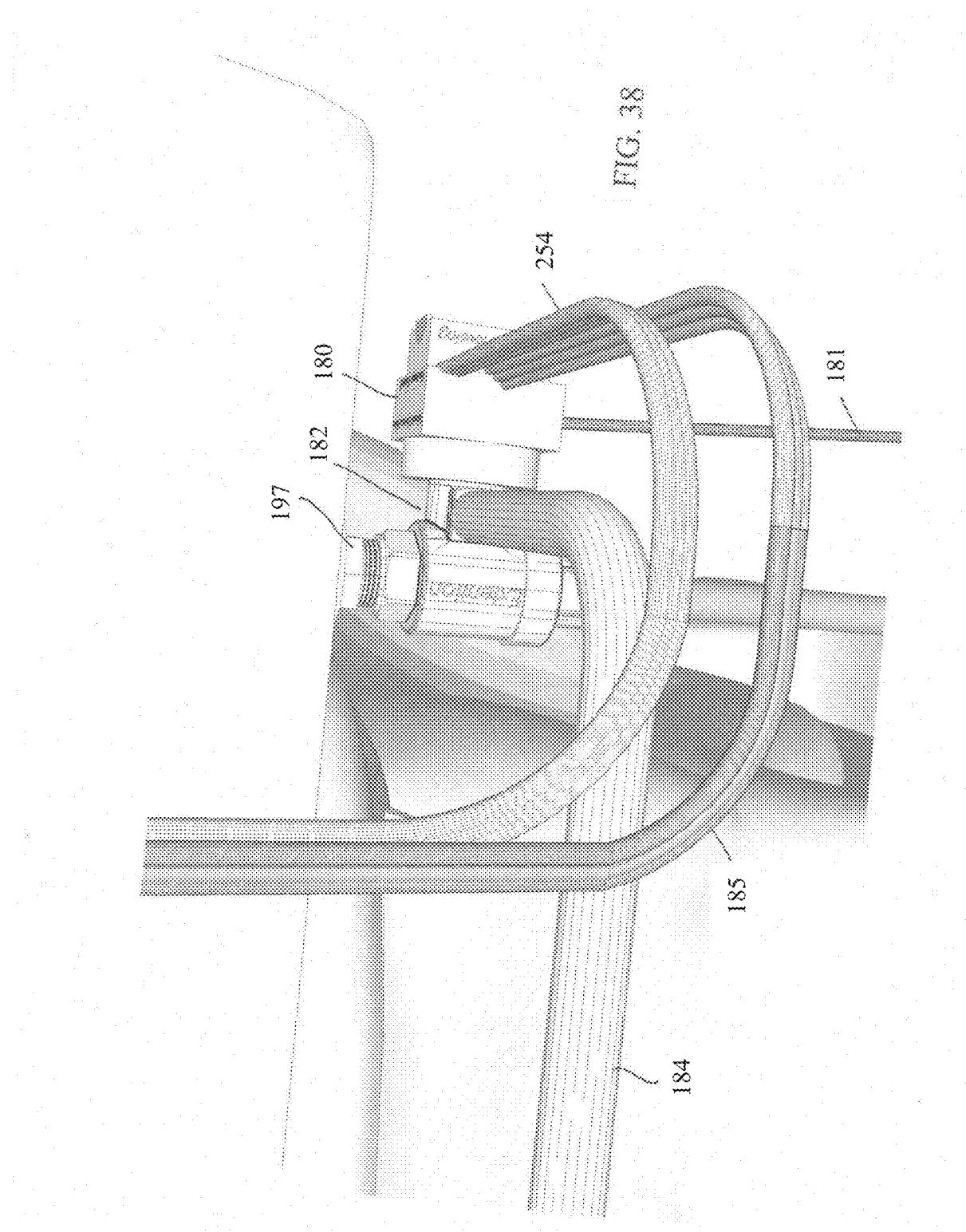

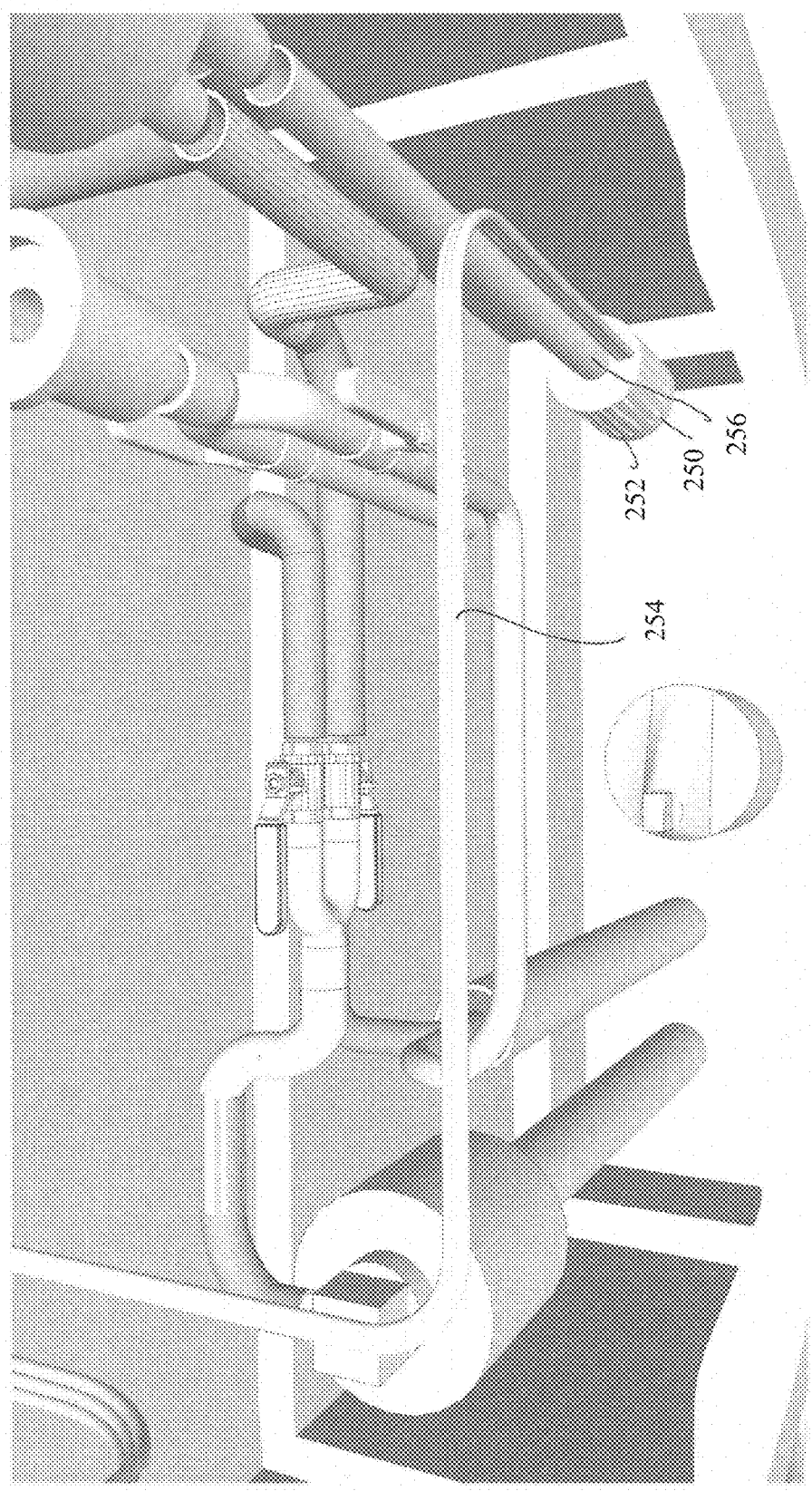

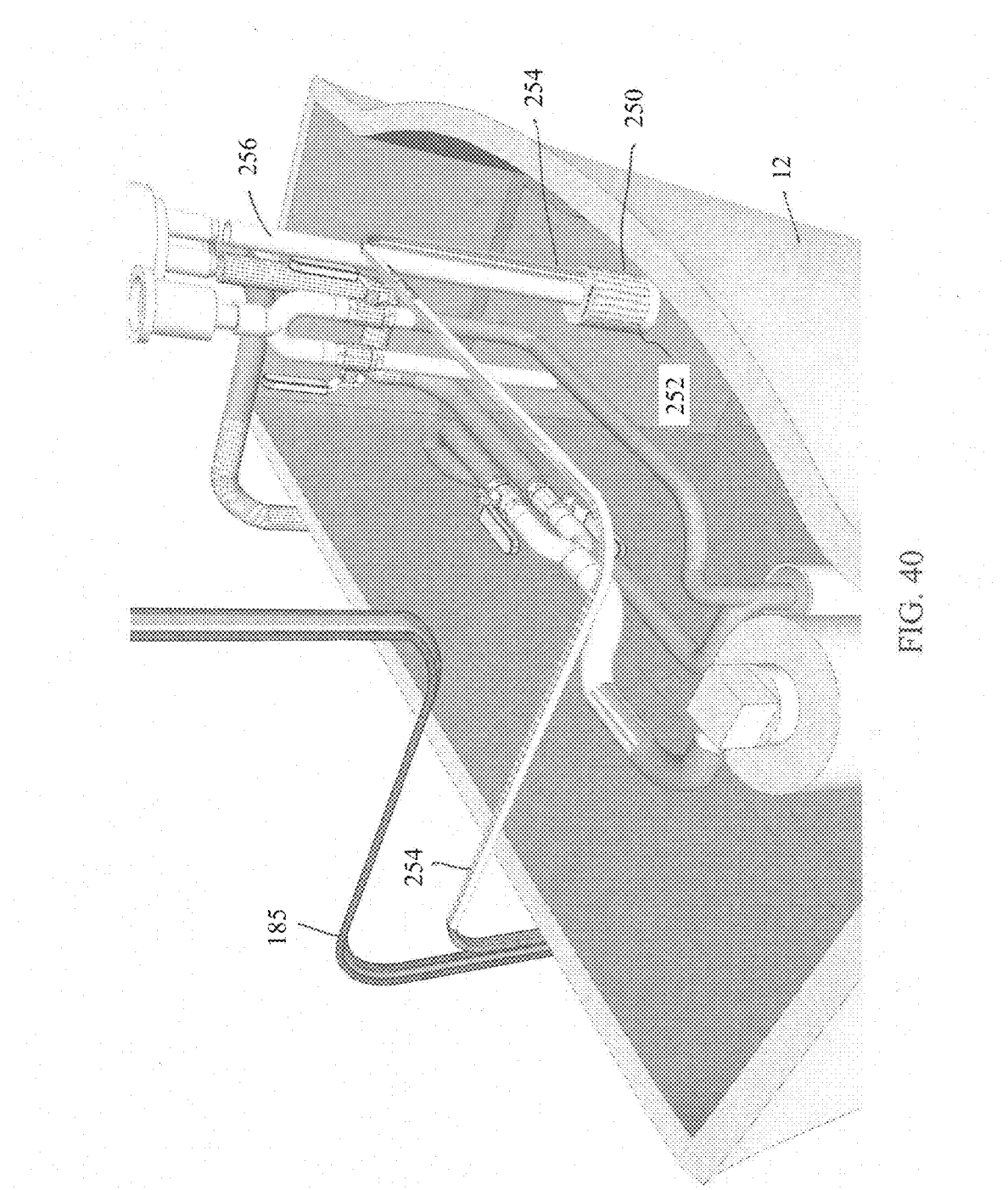

APPARATUS AND METHOD FOR USING A TOILET AS A WATER SUPPLY FOR PETS

CROSS REFERENCE TO RELATED APPLICATION

The present application claims the benefits, under 35 U.S.C. §119(e), of U.S. Provisional Application Ser. No. 61/445,887 filed Feb. 23, 2011 entitled "Apparatus and Method for Using a Toilet as an Automatic Water Supply for Pets" and U.S. Provisional Application Ser. No. 61/497,680 filed Jun. 16, 2011 entitled "Apparatus and Method for Using a Toilet as a Pet-Triggered Water Supply for Pets" which are incorporated herein by this reference.

TECHNICAL FIELD

The invention relates to devices to adapt toilets for use as a source of drinking water for pets.

BACKGROUND

A common concern of pet owners is to provide fresh drinking water for their pets particularly in hot, dry conditions and/or during periods when the owner is not present. Attempts have been made, therefore, to provide a water source for pets which is automatically refreshed. For example U.S. Pat. Nos. 4,470,371 and 5,782,202 disclose a pet dish connected to a water line whereby a float valve in the dish causes the water to be replenished. U.S. Pat. No. 7,267,078 discloses an automatically refillable pet dish incorporated into a refrigerator. Such devices however do not automatically refresh the contents of the water dish so the pet's water may become stagnant and unhealthy. There is therefore a need for a water dish for pets which is regularly and automatically refilled and refreshed.

The foregoing examples of the related art and limitations related thereto are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

The present invention therefore provides a method of providing an automatically refreshed water supply for pets by diverting water from the flush cycle of a toilet to an exterior dish which fills to a predetermined level and then overflows into the toilet. The invention also provides an apparatus for adapting a toilet system to create an automatically refreshed water supply for pets which comprises means to divert water from each flush cycle of a toilet to an exterior dish which fills to a predetermined level and then overflows into the toilet. The invention also provides an apparatus for adapting a toilet system to create an automatically refreshed water supply for pets which comprises means to direct water to a water dispensing element. The water dispensing element can be a water fountain, dish or a surface over which water flows. The means to direct water to the water dispensing element can be a sensor element such as a pressure or motion sensor, or the toilet's flush activation element.

The present Applicant has also discovered various improvements to make such devices more useful for pets by providing a mechanism for triggering the replacement water flow by the motion or weight of the pet. The invention thus provides a method and apparatus for adapting a toilet system to create an automatically refreshed water supply for pets which comprises means to direct water to a water dispensing element. The water dispensing element can be a water fountain, dish or a surface over which water flows. The means to direct water to the water dispensing element can be a sensor element such as a pressure or motion sensor, or the toilet's flush activation element to divert water from each flush cycle of a toilet to the water dispensing element. The invention provides a mechanism for triggering the replacement water flow by the motion or weight of the pet. Thus the system can be pet-triggered for the toilet flush and/or flow of replacement water to the water dispenser.

In addition to the exemplary aspects and embodiments described above, further aspects and embodiments will become apparent by reference to the drawings and by study of the following detailed descriptions.

BRIEF DESCRIPTION OF DRAWINGS

Exemplary embodiments are illustrated in referenced figures of the drawings. It is intended that the embodiments and figures disclosed herein are to be considered illustrative rather than restrictive.

FIG. 38 is a detail perspective view of the controller and solenoid valve of the invention where a power supply to a pump is also provided.

FIG. 39 is a detail perspective view of an embodiment of the invention using a pump.

FIG. 40 is a further detail perspective view of the embodiment shown in FIG. 39.

DESCRIPTION

Figure 1:
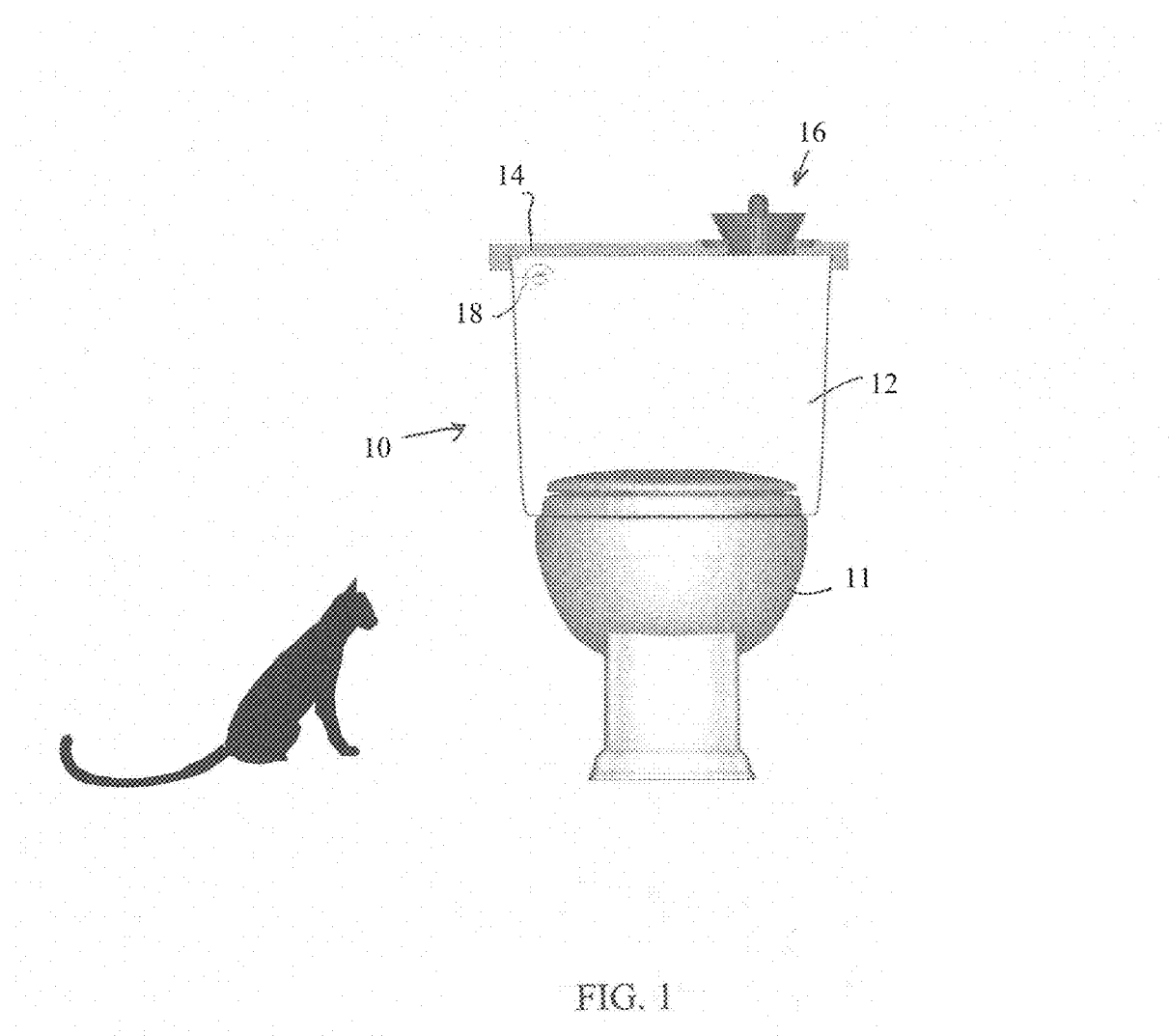
FIG. 1 is a front view of a toilet incorporating the invention, showing the toilet tank lid and adapter device in cross-section.
Figure 2:
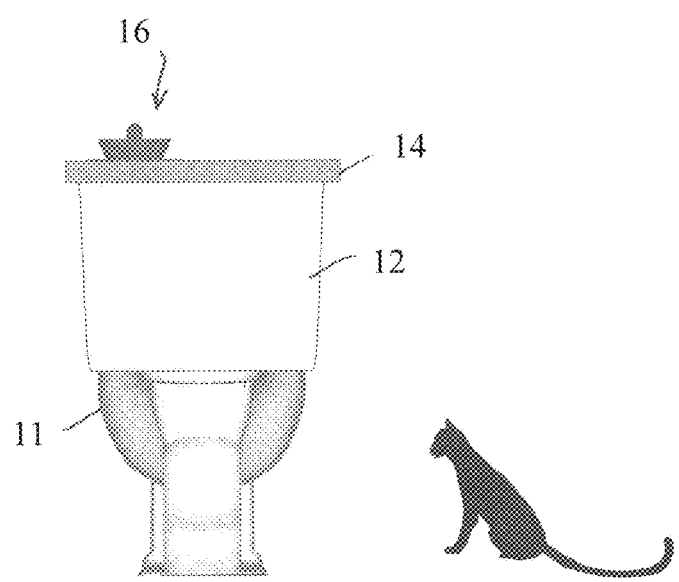
FIG. 2 is a rear view of a toilet with the device installed.
Figure 3:
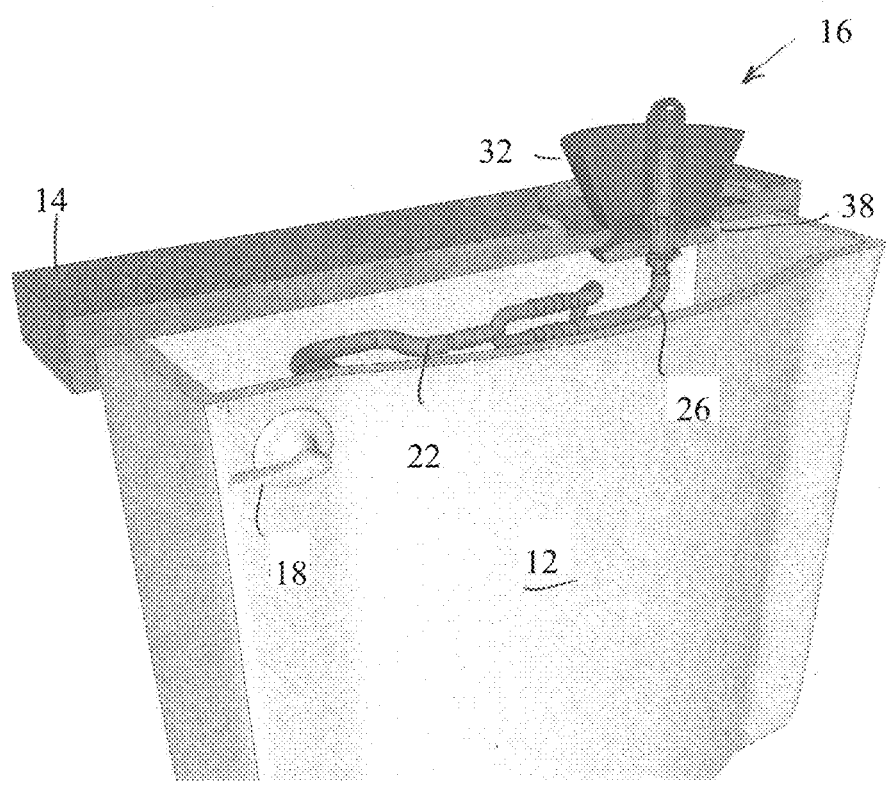
FIGS. 3-7 are detailed perspective views of a toilet incorporating the invention, showing the toilet tank lid and adapter device in cross-section.

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

With reference to FIG. 1-7, a standard toilet 10 has a toilet bowl 11 and a water tank 12. A modified adapter lid 14 adapted according to the invention is provided. When handle 18 is activated, the tank 12 drains and once at a suitable level, a ballcock valve 20 causes water to flow into the tank 12 through refill tube 22 into overflow tube 24. The present invention diverts some or all of the water from the refill tube 22 to diversion tube 26 which carries the water to the pet dish 16 and the remainder through tube 23 to overflow tube 24. The water flows up the column 28 and out apertures 30. The water fills the bowl 32 until it overflows over the top edge 34 of bowl 32 and flows into reservoir 36 and through apertures 38 in lid 14 and back into the tank 12. A valve can be provided on diversion tube 26 and tube 23 to regulate the volume of flow to bowl 32 and into overflow tube 24.

Thus the pet bowl 16 is refilled with fresh water, or water is otherwise dispensed as described below, each time the toilet is flushed. The pet climbs onto the lid 14 to drink from the bowl 16. Thus the device is suitable for pets which can reach the upper lid of the toilet by climbing onto the toilet seat and then onto the toilet lid, or otherwise accessing the pet dish 16. This would include dogs, cats, rabbits, ferrets, birds and the like.

While the preferred embodiment determines the level of water in bowl 32 by overflowing over the top edge 34, it will be apparent that the same result can be achieved by providing slots, holes or apertures in the side of bowl 32 at the level desired. The overflow function can also be achieved in other ways such as a pipe, hose or hoses to transfer the water to the tank at the desired level. The overflow can also be directed to the toilet bowl 11 directly rather than to tank 12.

Also rather than utilizing a bowl 32 shape it will be apparent that different shapes for bowl 32, such as a shallow dish or pan will function in the same way. Similarly lid 14 and the location of the device 16 on lid 14 could be modified to adapt it for the type of pet to facilitate the type of pet for which the invention will be used. For a large dog, for example, lid 14 can be extended horizontally to provide a large sitting area, or indeed could be designed so that only the dog's front paws are placed on the lid 14. For smaller pets an intermediate platform attached to lid 14 at a lower elevation could be provided or even a series of platforms or steps to assist the smaller pet to access the water in bowl 32. Lid 14 need not be located on top of tank 12 but could stand separately and be fixed to a wall or have a separate stand to be more accessible to the pet. Lid 14 could be multiple pieces to separate its functions.

To improve the quality of the water in the pet dish, filtration can be incorporated into line 26 and/or column 28. While the invention has been described in the context of current toilet reservoirs it will be apparent that toilet systems which do not utilize current toilet tanks could also be adapted to the invention by diverting the flush cycle water to the pet dish. In addition to pet water supply, the present invention can be used to supply fresh water to plants, such as grass cultivating dishes, for example by attaching the dishes to the upper edge 34 of bowl 32 so that the roots of the plants are supplied water from the surface of the water retained in bowl 32. Such dishes (see FIG. 21-26 below) could be removably held in slots in edge 34, or could have a removable snap fit onto edge 34. Such dishes could contain an absorbent surface communicating with the water surface whereby plant seeds are kept above the water level but roots which are generated extend below the water line.

While bowl 32 is shown in the preferred embodiment as extending above lid 14, it may also be positioned below the upper surface of lid 14 of the toilet tank, so that the water level in bowl 32 is at or below the upper surface level of lid 14, with the overflow lip or apertures of bowl 32 below that level. It is only necessary that the elevation of the water in bowl 32 be either above the toilet bowl's water or above the tank's water lines. Bowl 32 therefore could be located anywhere in, on, below, above or to one side of the lid 14. As noted above, where the bowl 32 drains directly into the toilet bowl 11 it could be installed at a lower location. The only requirement is that the excess water that overflows from bowl 32 is drained into either the tank 12 or the toilet bowl 11.

The delivery of water to bowl 32 may be from above the base of the bowl 32, as shown in the diagrams, to fountain water into bowl 32, or the water may be introduced from below the water line in the bowl 32 directly by the line 26, in which case a one-way valve on line 26 is used to prevent return of water to supply line 26.

While the embodiment shown uses one type of ballcock valve 20, it will be understood that many different types of toilet refill valves are available and while different adapters will be required to achieve diversion of the incoming water in the toilet tank 12, the specific type of refill valve and diverter used is not essential to the operation of the invention.

To provide automatic refreshing of the water supply while the owner is away, a further adapter can be provided to automatically flush the toilet at pre-set intervals, by providing a timer which activates an piston or arm (not shown) driven by an electric motor to depress the flush handle 18.

Figure 35:
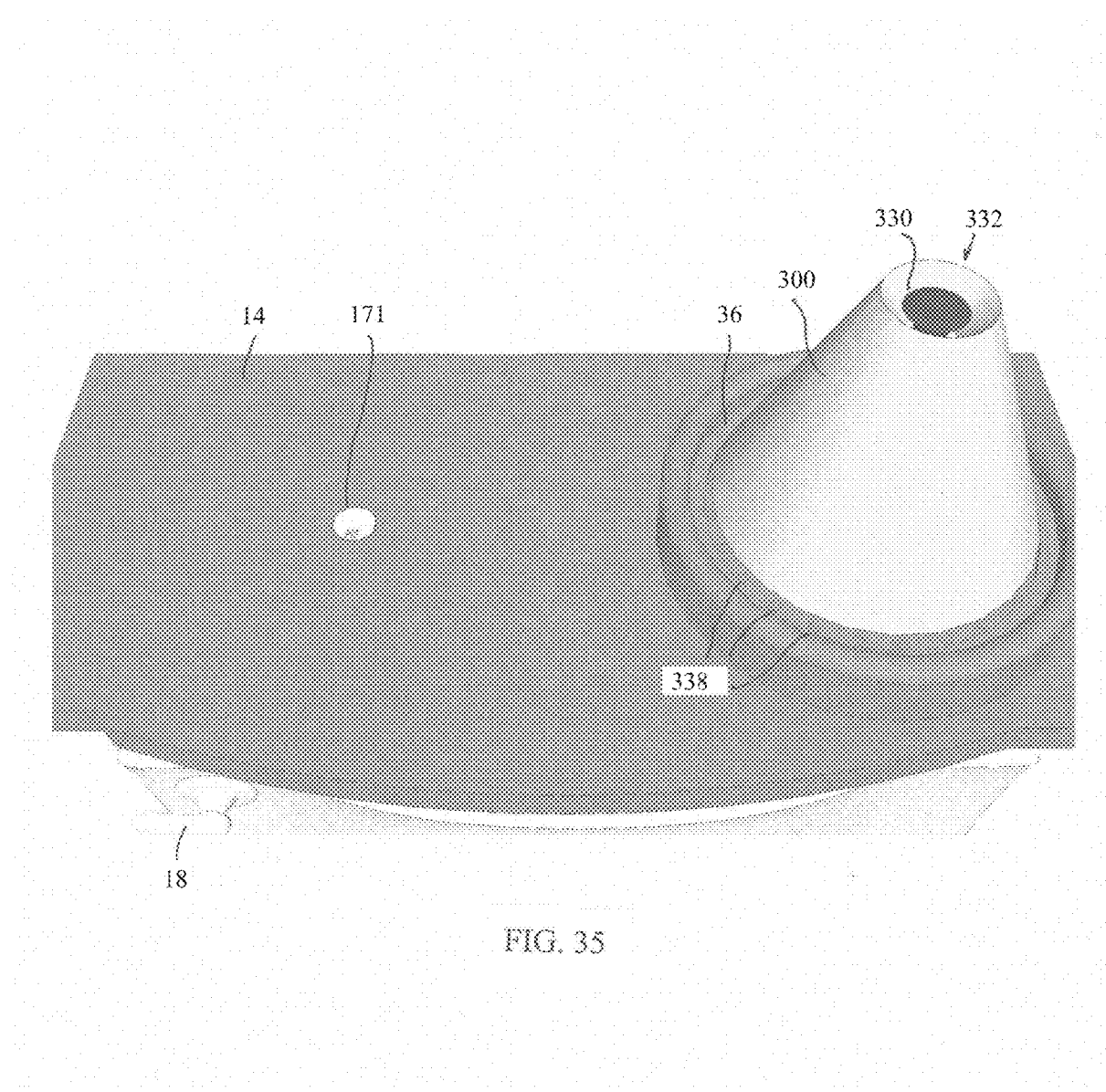
FIG. 35-37 are top front perspective detail view of the adapter lid according to further embodiments of the invention.
Figure 36:
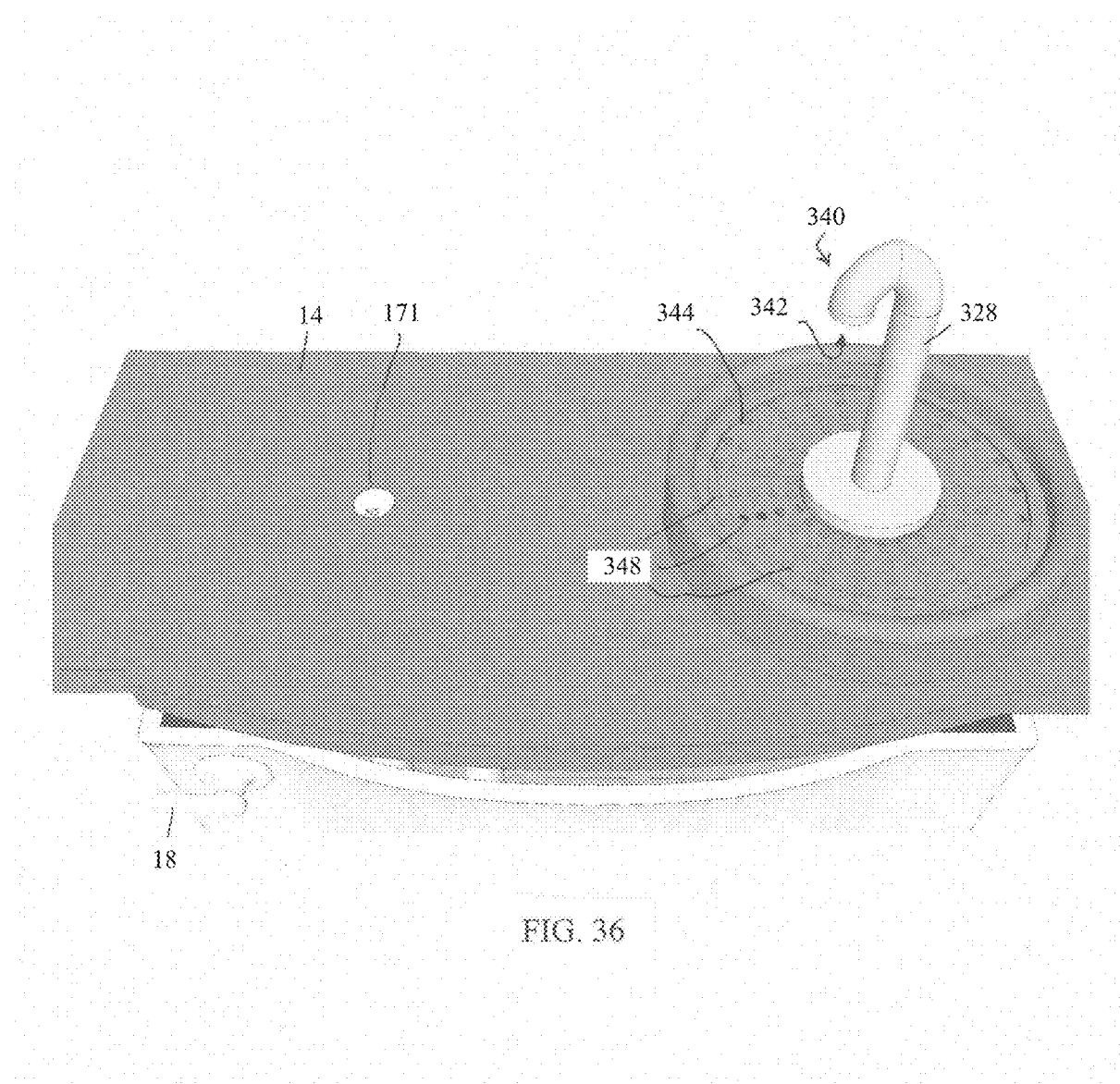
Figure 37:
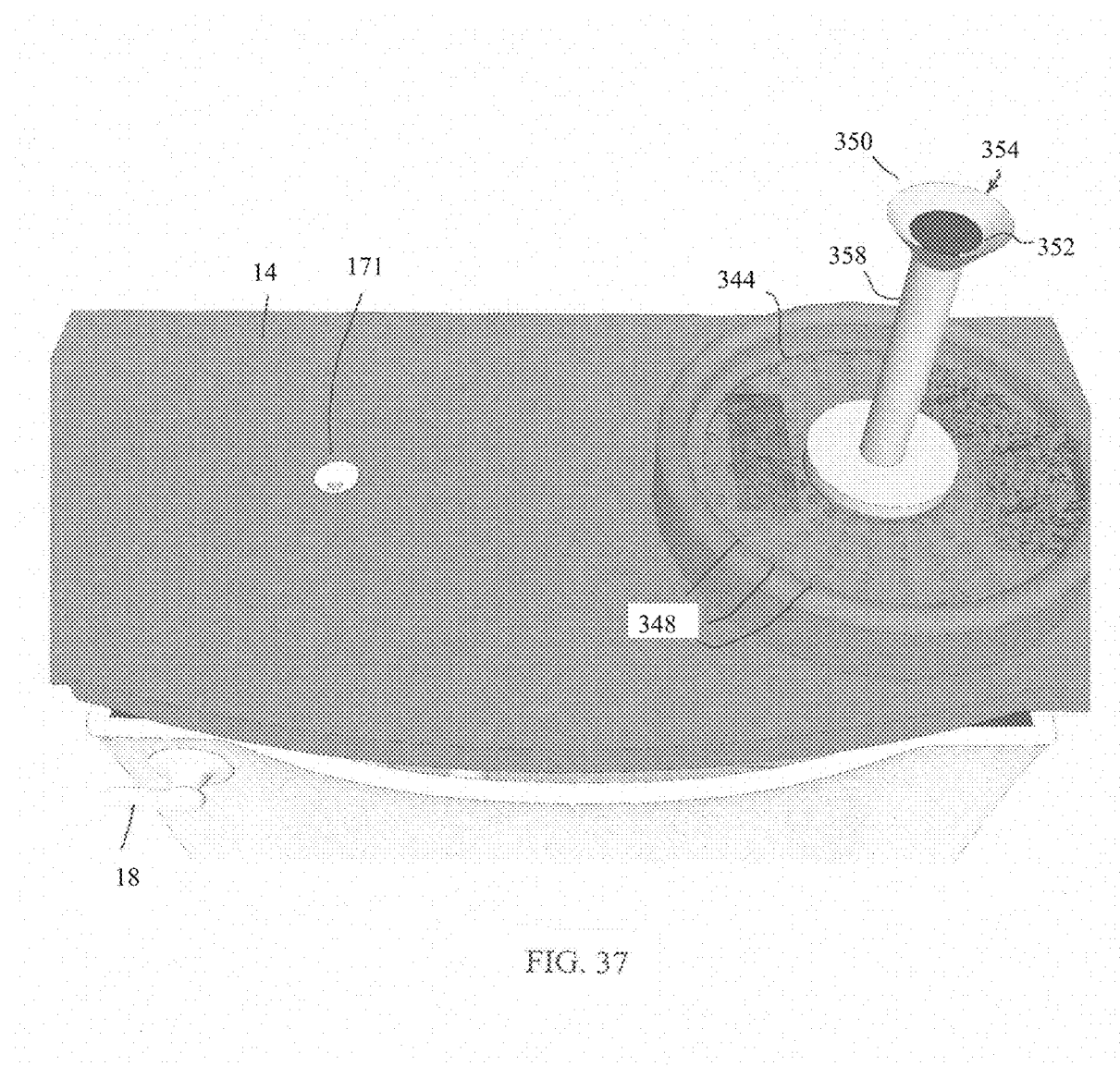

Thus the invention provides an apparatus for retaining water for supply to pets from a dish, cup or bowl and periodically refreshing it with every flush of the toilet to automatically change it to keep it always fresh. This is achieved by water overflowing from the edge of the cup or dish or through holes on the side of the cup, or by a water dispensing surface or fountains described in respect of FIG. 35-37 below. The device according to one embodiment therefore does not use excess water beyond what is used for the toilet flushing other than the small amount of water for the first filling of the pet dish and what is consumed by the pet. According to other embodiments the amount of water in each flow is preset by a controller. With the use of sensors, water in the dispensing element can be refreshed by opening of a solenoid valve when a pet is detected (or activated when the pet leaves to avoid frightening the pet). Or the water being dispensed can flow as long as the pet is detected, as shown in FIG. 35-37. Or water can be continuously pumped and kept moving by having a pump in tank 12, or cup 16 or reservoir 36, as shown in FIG. 38—.

FIGS. 8-11 illustrate step accessories to facilitate the use of the present Applicant's adapter for a toilet system to create an automatically refreshed water supply for smaller pets. The standard toilet 10 has a toilet bowl 11, water tank 12, toilet seat 13 and toilet seat lid 114. A step accessory 116 is provided to assist the pet in reaching the water bowl on the top of tank 12. Two vertical arms 118 have hooks 120 which are secured over the upper edges of tank 12. Step panel 122 is hingedly mounted on the lower ends of arms 118 by hinges 124. In this way when seat lid 114 is raised, step panel 122 rotates to a vertical position, and when seat lid 114 is lowered, step panel 122 drops to the horizontal position shown in FIG. 8.

Figure 9:
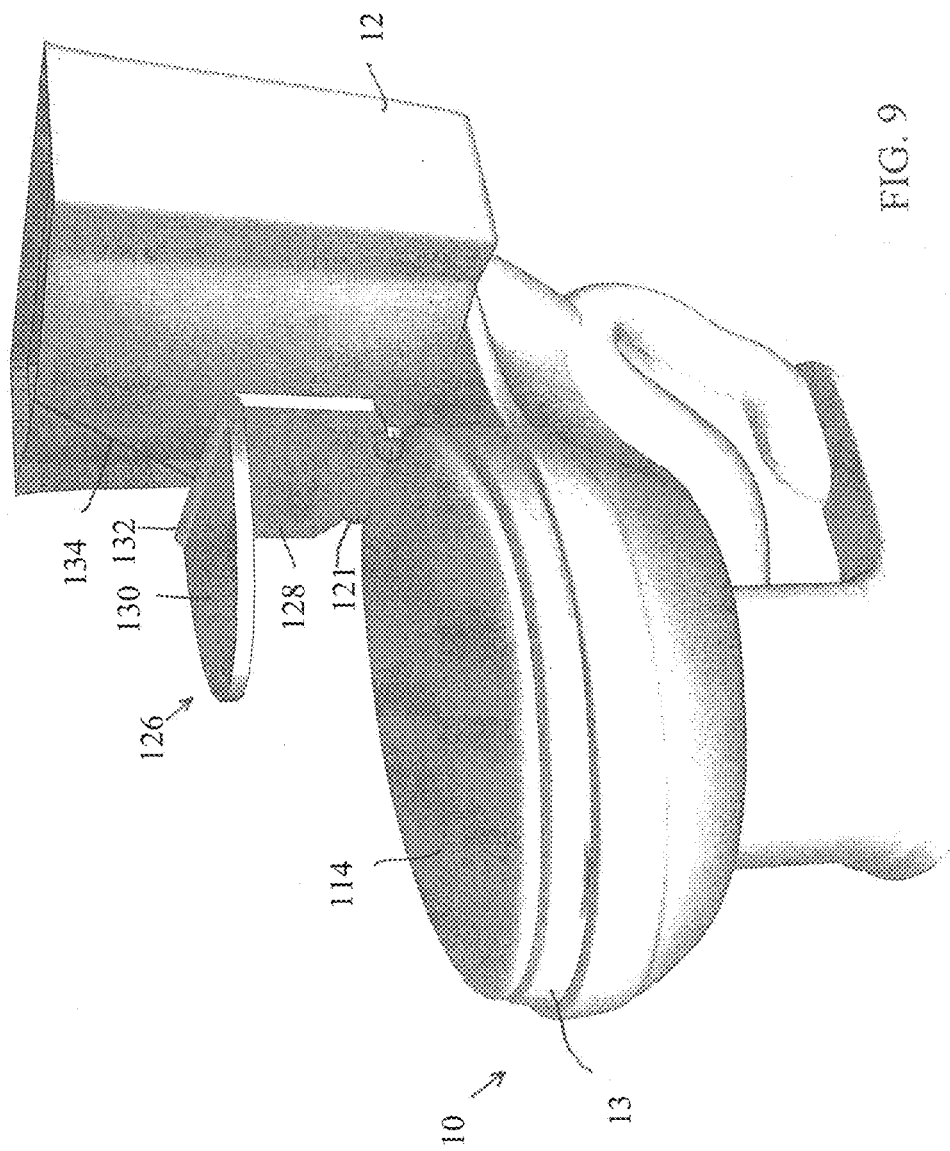

A second embodiment of a step accessory 126 is shown in FIG. 9, also to assist the pet in reaching the water bowl on the top of tank 12. A vertical panel 128 is hingedly connected to seat 13 and seat lid 114 by hinges 121. Step panel 130 is hingedly mounted on the upper edge of panel 128 by hinge 132. A chain 134 releasably connects the upper edge of tank 12 to hinge 132. In this way when chain 134 is connected as shown in FIG. 9, step panel 130 rotates to a horizontal position to support the weight of the pet. If seat lid 114 is then raised, step panel 130 rotates to a vertical position, and when lid 114 is lowered, step panel 130 drops to the horizontal position shown in FIG. 9. When chain 134 is disconnected, panels 128 and 130 rotate to lie flat against seat lid 114. Means such as a magnet, latch or bolt can be used to secure panels 128/130 against seat lid 114.

Figure 10:
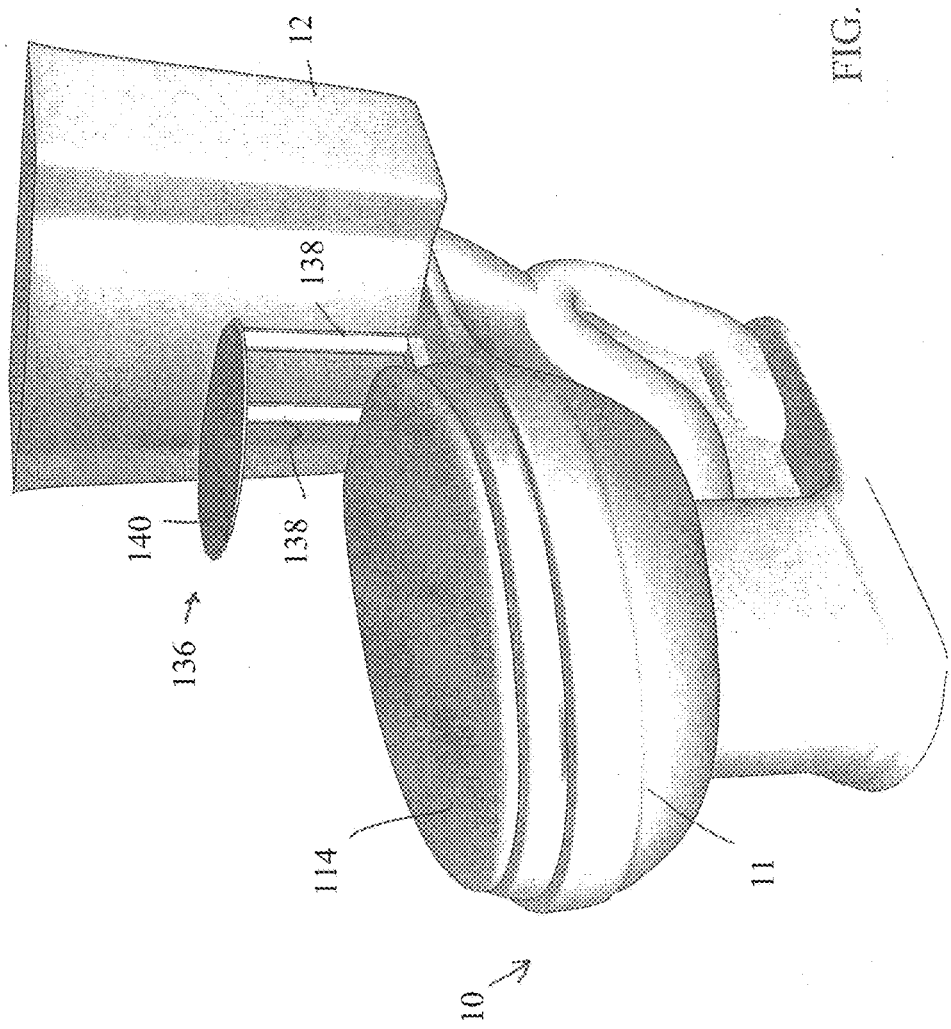

A third embodiment of the step accessory 136 is shown in FIG. 10, also to assist a small pet in reaching the water bowl 16 on the top of tank 12. Two vertical arms 138 are fixed to toilet bowl 11 at their lower end. Step panel 140 is hingedly mounted on the upper ends of arms 138 by hinges (not shown). In this way when seat lid 114 is raised, step panel 140 rotates to a vertical position, and when seat lid 114 is lowered, step panel 140 drops to the horizontal position shown in FIG. 10.

Figure 11:
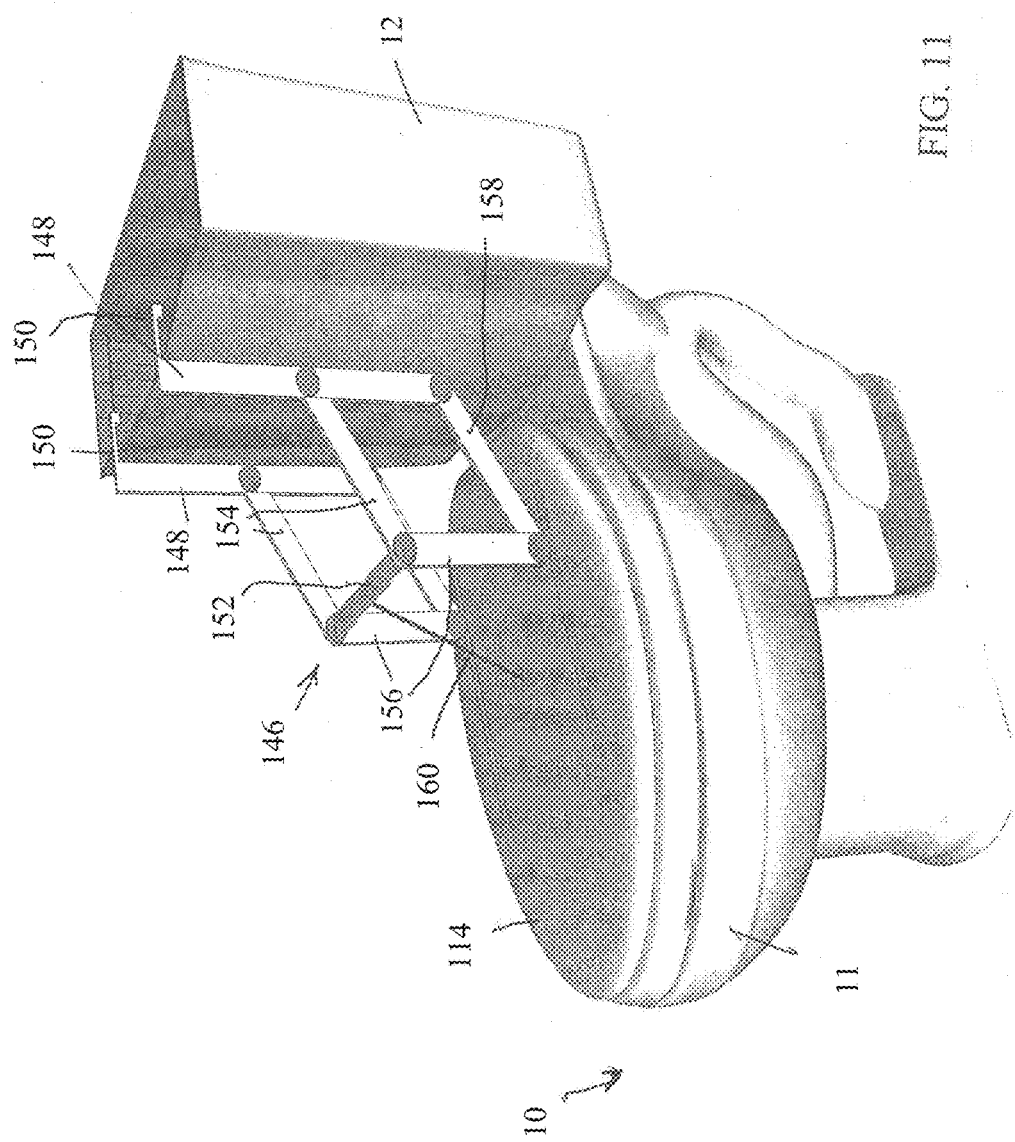
Figure 12:
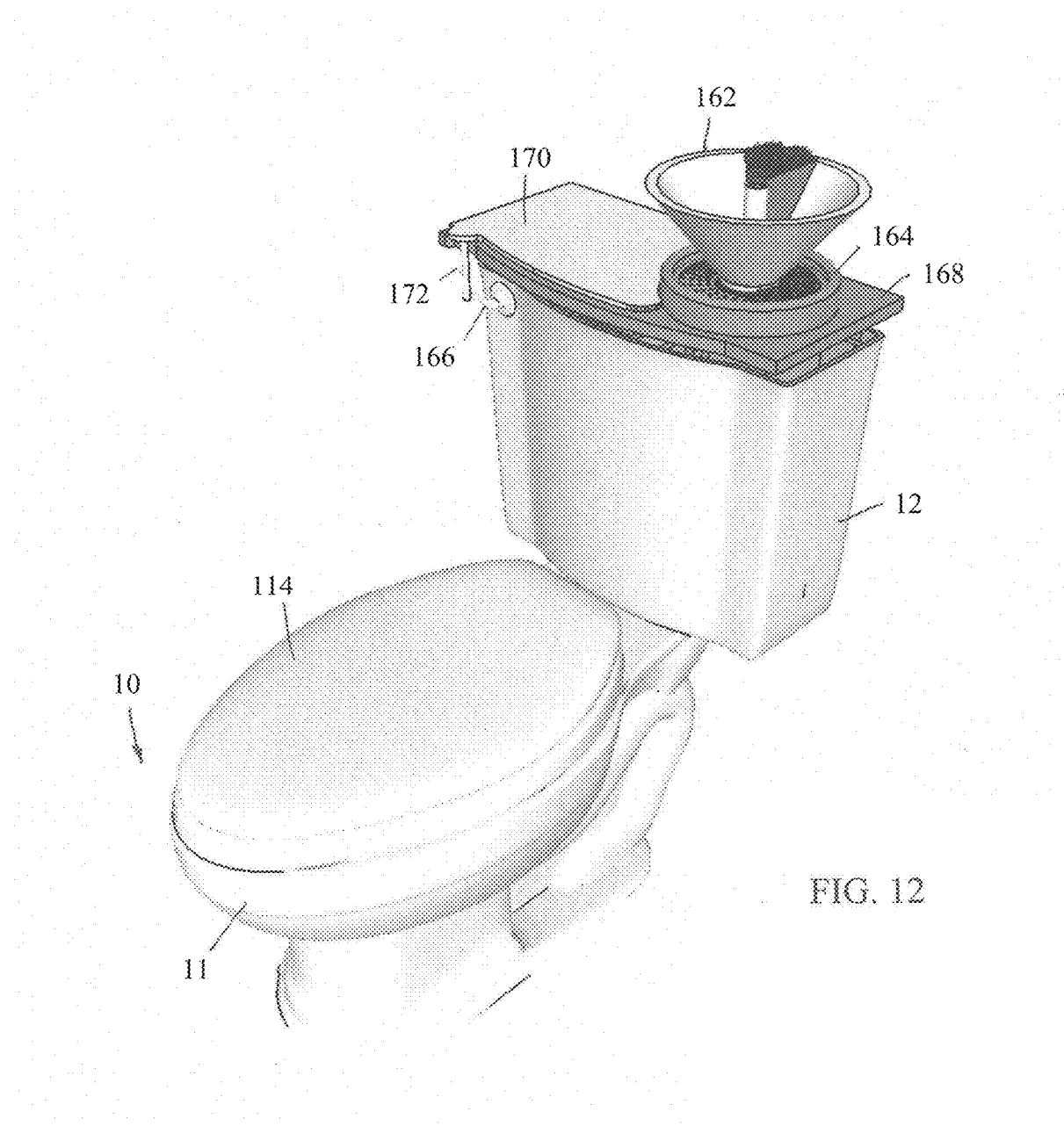
FIG. 12-15 illustrate an embodiment of the invention in which the pet triggers flushing of the toilet and/or water flow.
Figure 13:
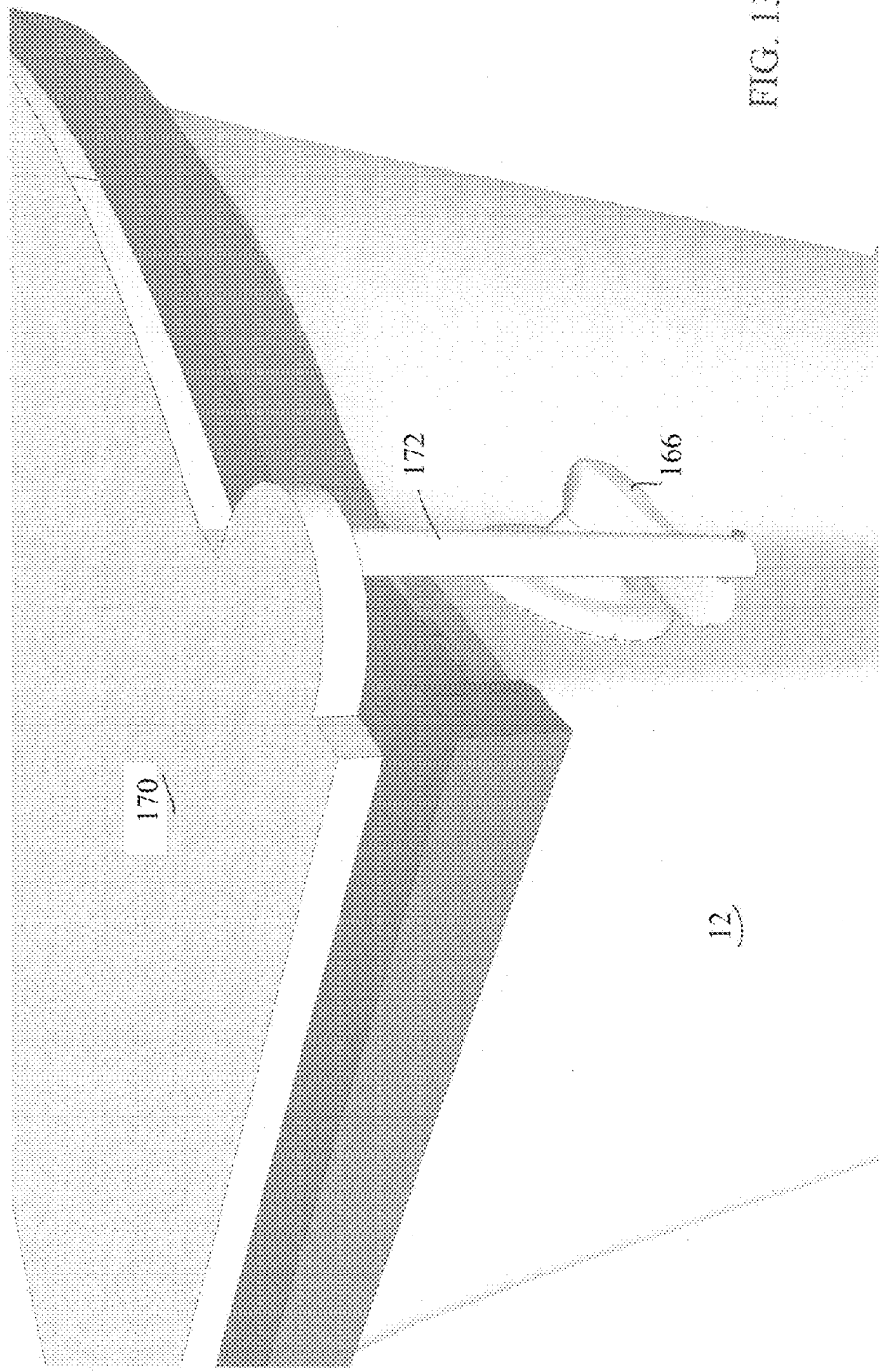
Figure 14:
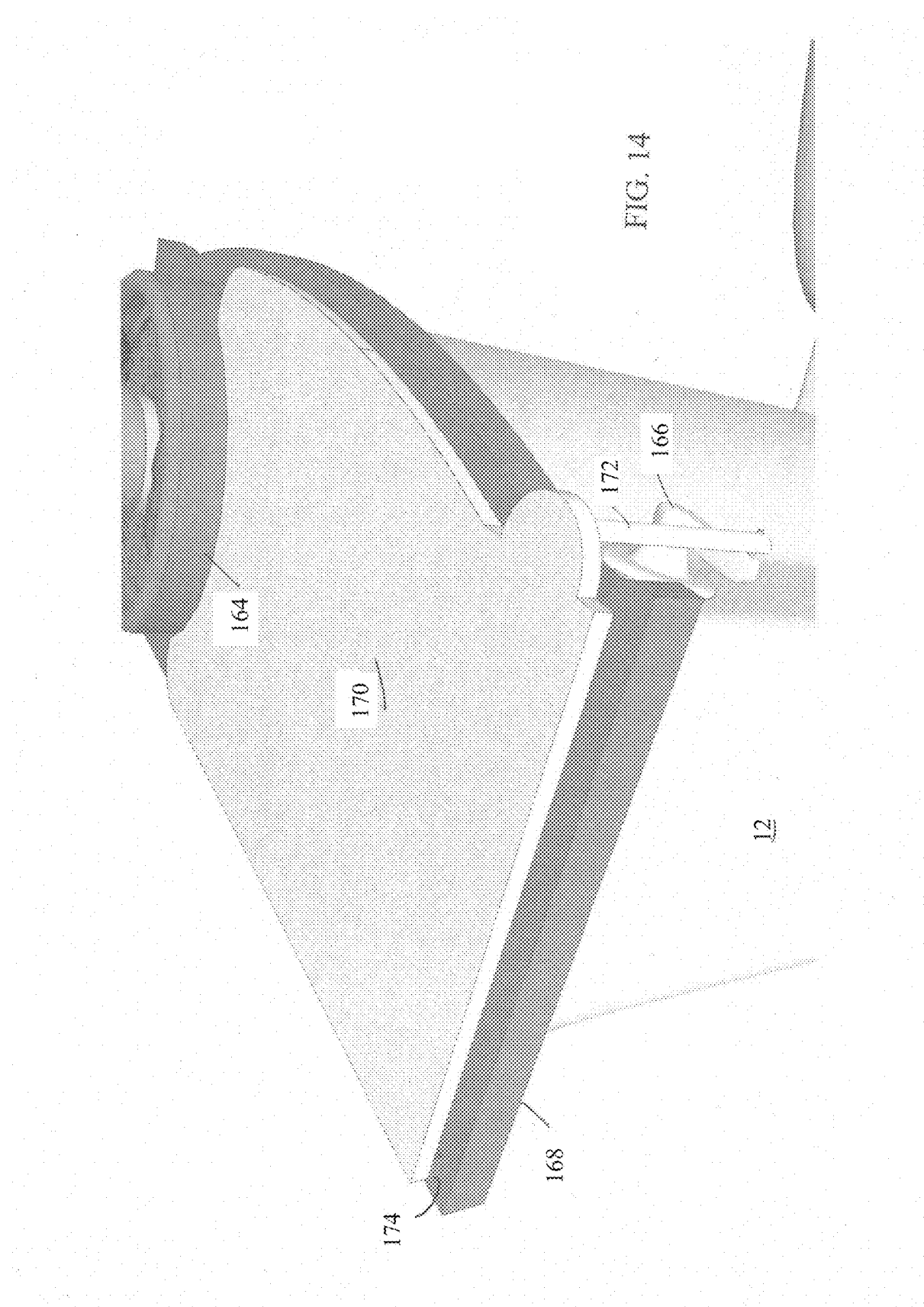
Figure 15:
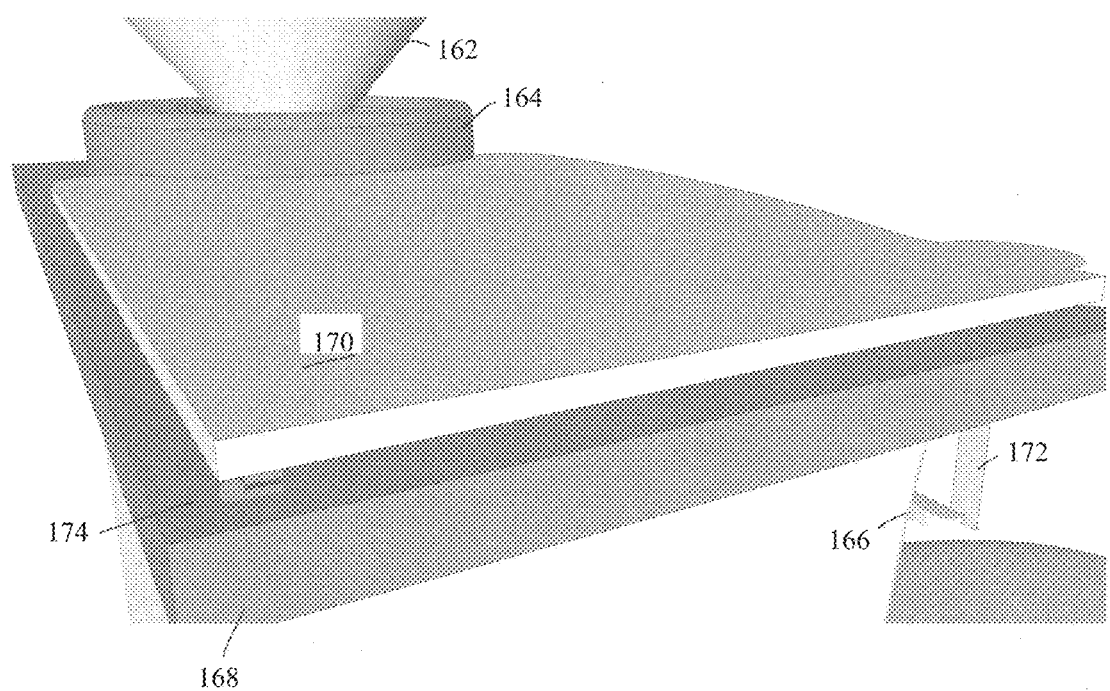

A fourth embodiment of a step accessory 146 is shown in FIG. 11, also to assist a small pet in reaching the water bowl 16 on the top of tank 12. Two vertical arms 148 have hooks 150 which are secured over the upper edges of tank 12. Step 152 is hingedly mounted on the lower ends of arms 154 and the upper ends of vertical arms 156 by hinges. Arms 158 hingedly connect the lower ends of arms 148 to the lower ends of arms 156 and the seat lid 114. In this way when seat lid 114 is raised, step 152 rotates to a vertical position, and when seat lid 114 is lowered, step 152 drops to the horizontal position shown in FIG. 11. The hinged step accessory can be spring-biased to raise to the vertical position and a chain 160 connecting step 152 and seat lid 114 can be added to hold the step 152 in the horizontal position when lid 114 is down.

A variation of the Applicant's adapter for a toilet system to create an automatically refreshed water supply for pets in situations where the toilet is not regularly flushed, such as where the pet owner may be away for extended periods is shown in FIG. 12-15 in which the weight of the pet, or a motion sensor to detect the presence of the pet, causes the toilet to flush and/or refresh the water in the pet water dish 162 either as a result of the flush or by directly triggering a water flow to the dish 162. Thus the pet dish 162 is refilled with fresh water each time the pet dish is approached by the pet, such as by causing the toilet to be flushed or directly turning on a water flow to the dish. Alternatives to the use of a dish are shown in FIG. 35-37 below in the form of a conical surface, upwardly directed fountain or water falling freely onto a surface. The adapter lid is constructed according to the aforementioned system so that when flush handle 166 is activated, the tank 12 drains and once at a suitable level, a ballcock valve causes water to flow into the tank through a refill tube. Some or all of the water from the refill tube is diverted to the pet dish 162. The water fills the dish 162 until it overflows over the top edge of dish 162 and flows into reservoir 164 and through apertures in lid 168 and back into the tank 12. It may also be necessary that some or all of the water that overflows from the dish be diverted into the overflow tube inside tank 12 to drain into the toilet bowl to fill the toilet bowl for the next use.

In order to permit the presence of the pet to trigger the flushing action, a hinged panel 170 is provided which is hingedly connected to the flush handle 166 by arm 172. Alternatively a motion sensor may be provided in connection with panel 170 to trigger flush handle 166. In one embodiment panel 170 may be connected to lid 168 by a hinge 174 (FIG. 14) along the rear edge of lid 168 so that the front edge of panel 170 will pivot vertically when weight is placed on it. Thus when a pet climbs onto the lid 168 to drink from the bowl 162, its weight will cause panel 170 to pivot downwardly, causing flush handle 166 to rotate and trigger the flushing mechanism.

Figure 16:
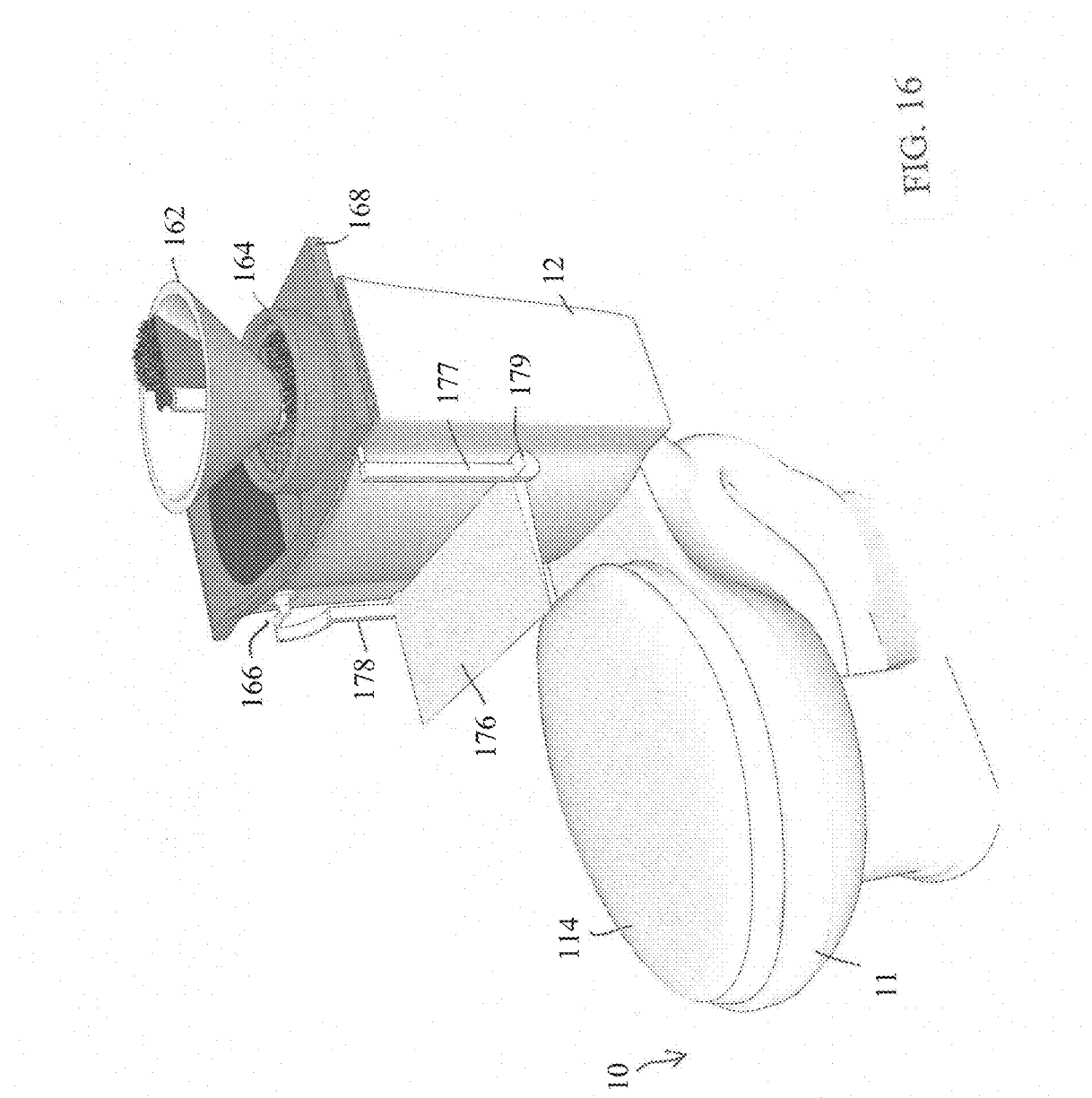
FIG. 16-24 illustrate further embodiments of the invention in which the pet triggers flushing of the toilet and/or water flow.
Figure 17:
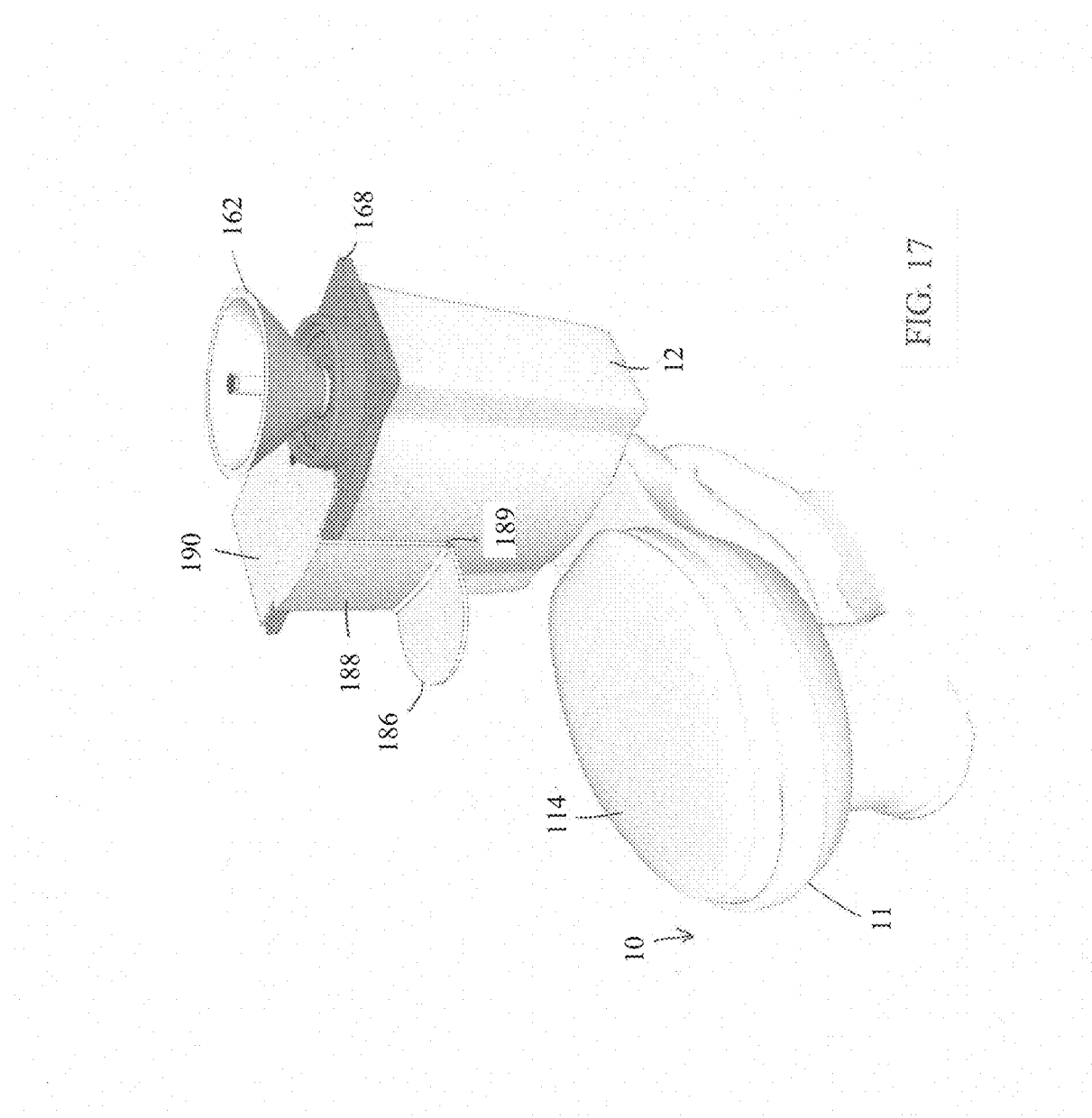
Figure 27:
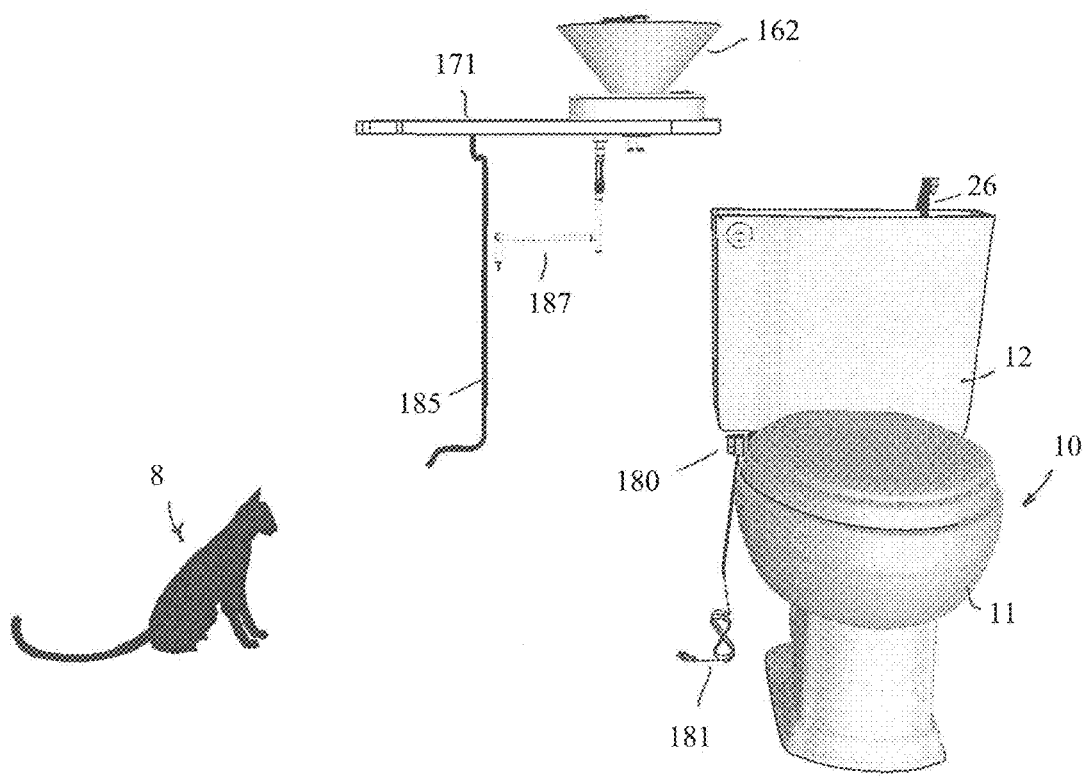
FIG. 27 is a front perspective exploded view of a further embodiment of the invention with the adapter lid separated for ease of illustration.
Figure 28:
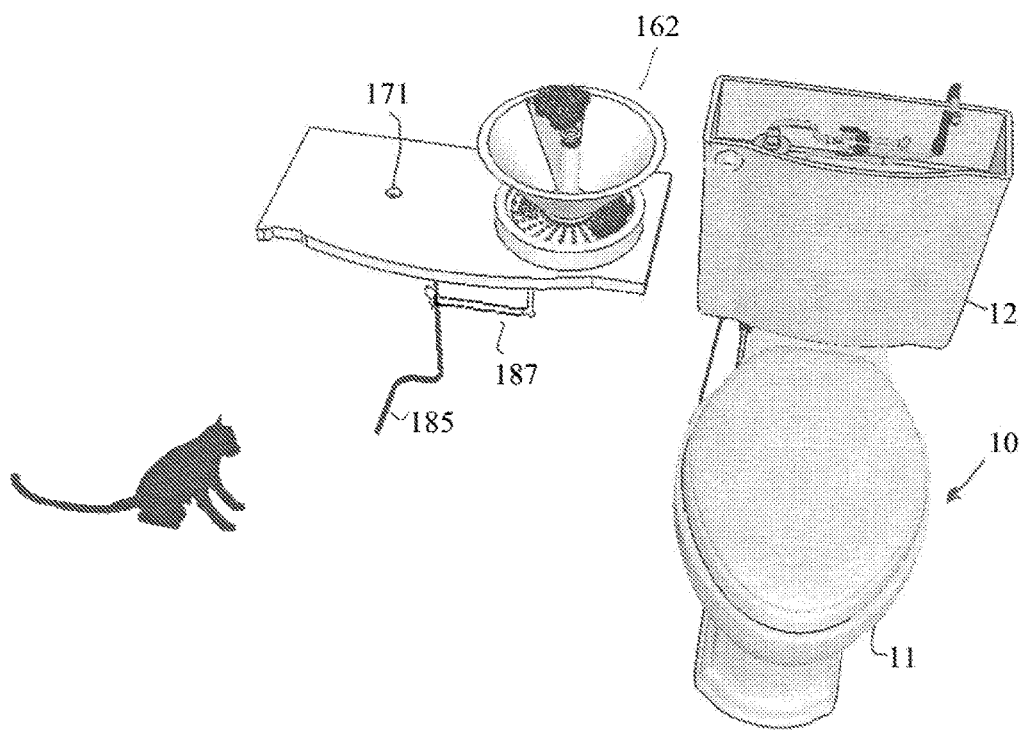
FIG. 28 is a top front perspective exploded view of the embodiment of the invention shown in FIG. 27.
Figure 29:
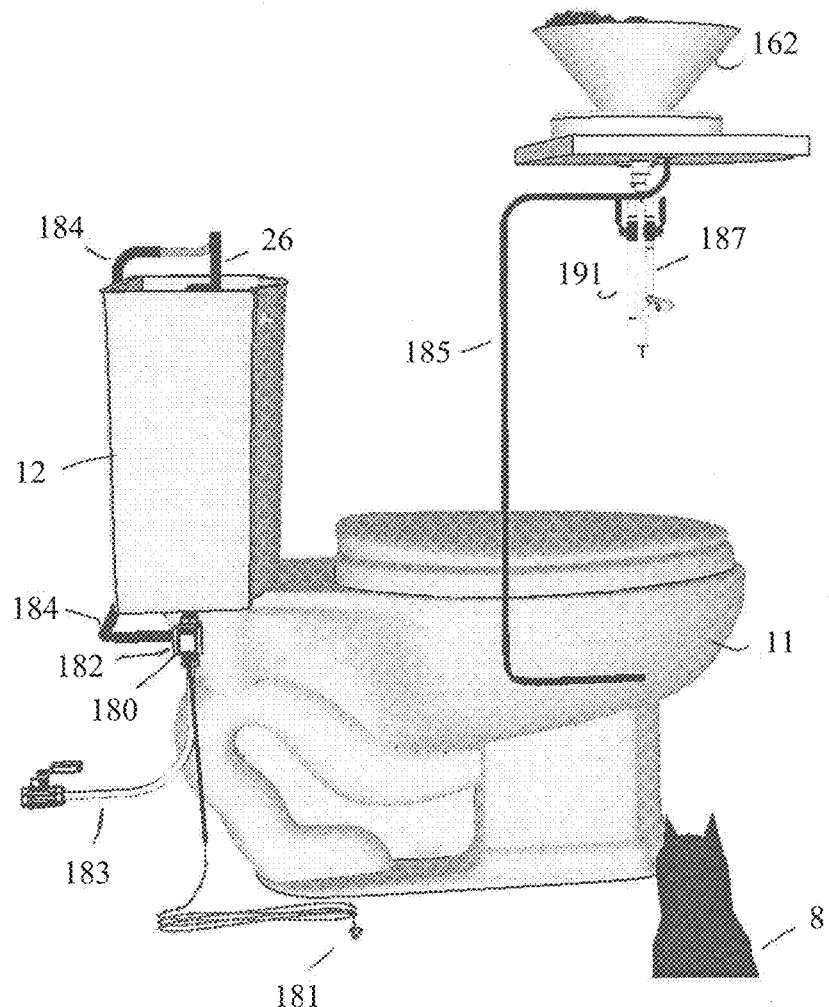
FIG. 29 is a left side perspective exploded view of the embodiment of the invention shown in FIG. 27.
Figure 30:
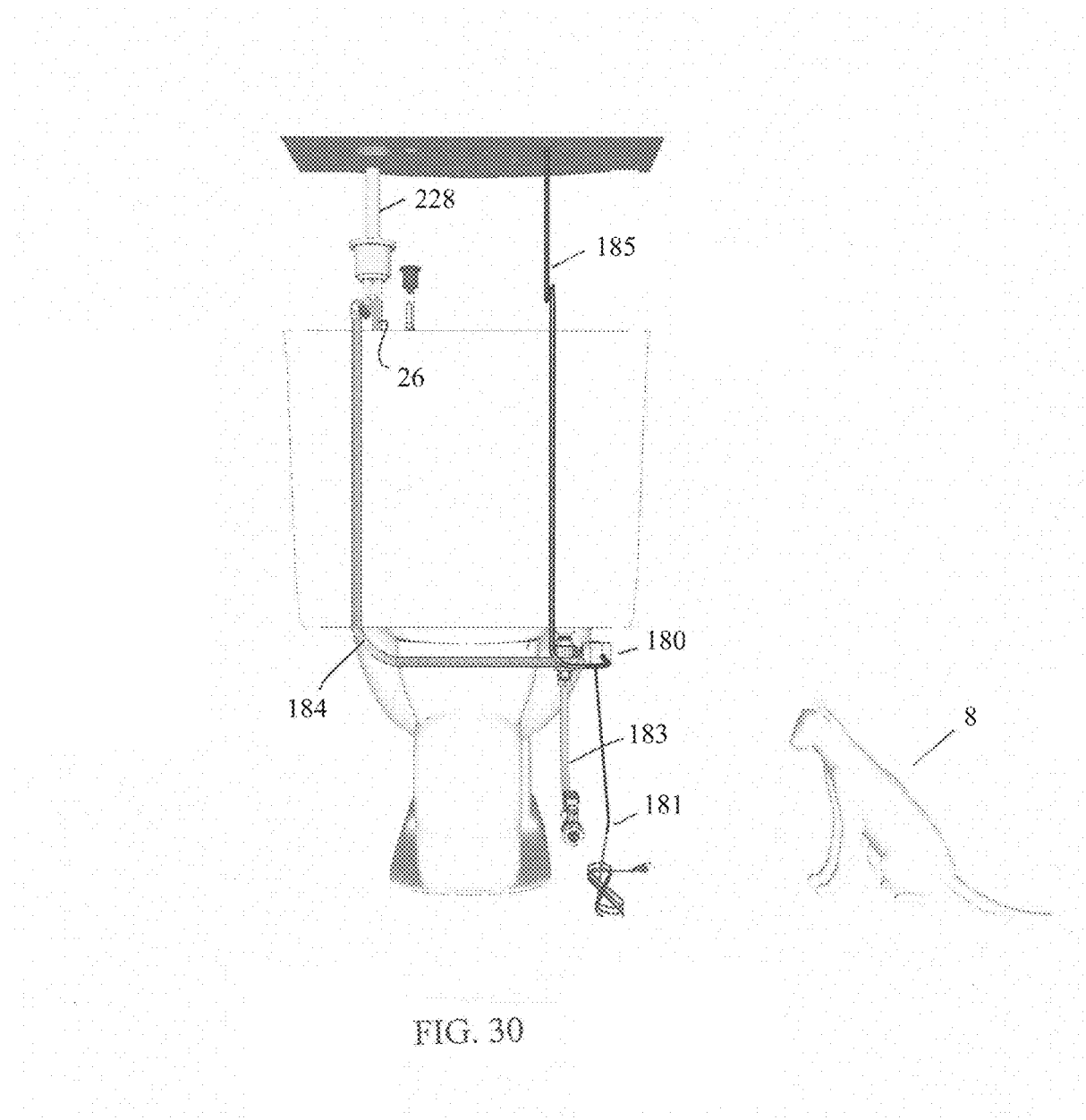
FIG. 30 is a rear perspective exploded view of the embodiment of the invention shown in FIG. 27.
Figure 31:
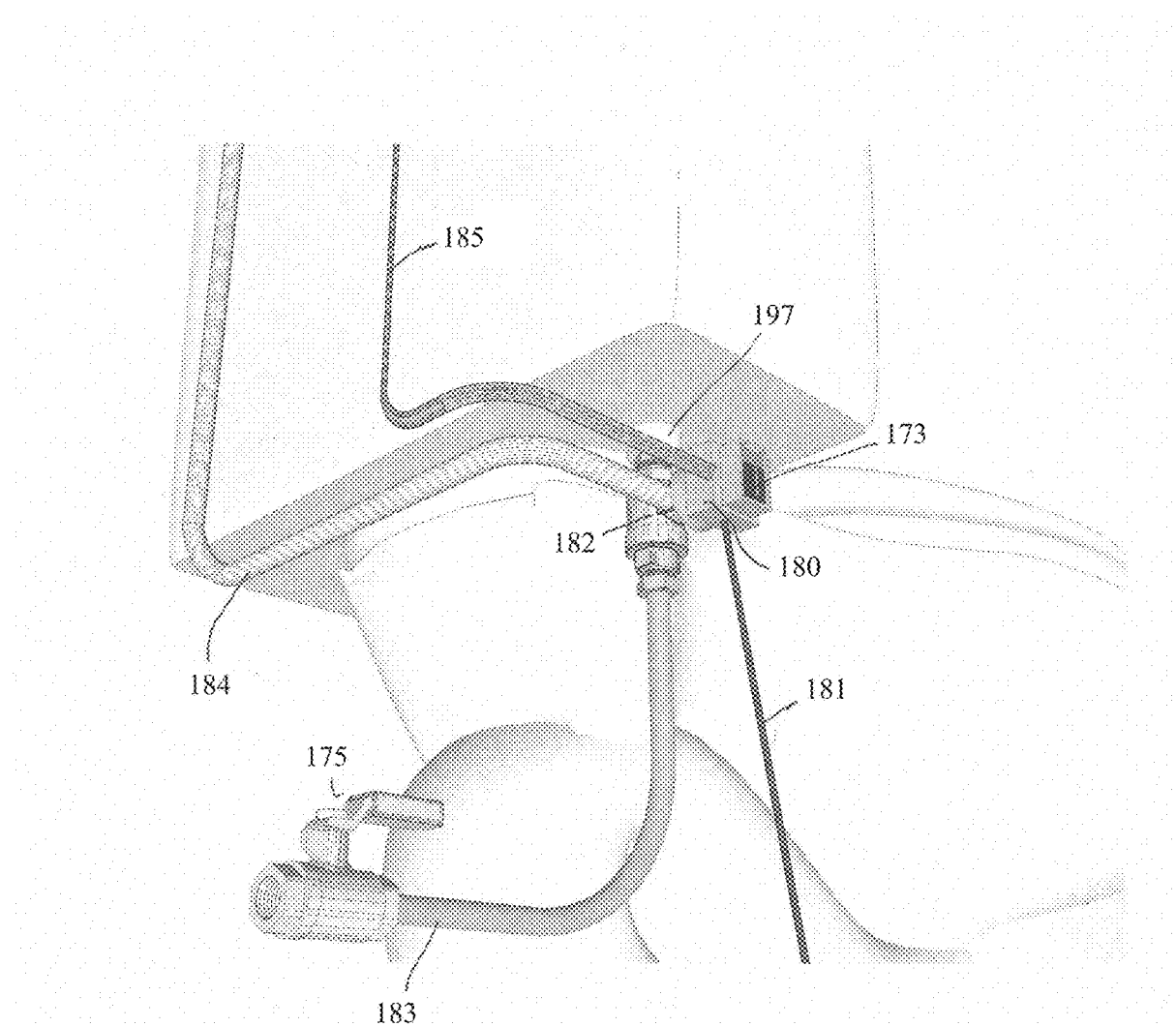
FIG. 31 is a lower left rear perspective detail view of the embodiment of the invention shown in FIG. 27.
Figure 32:
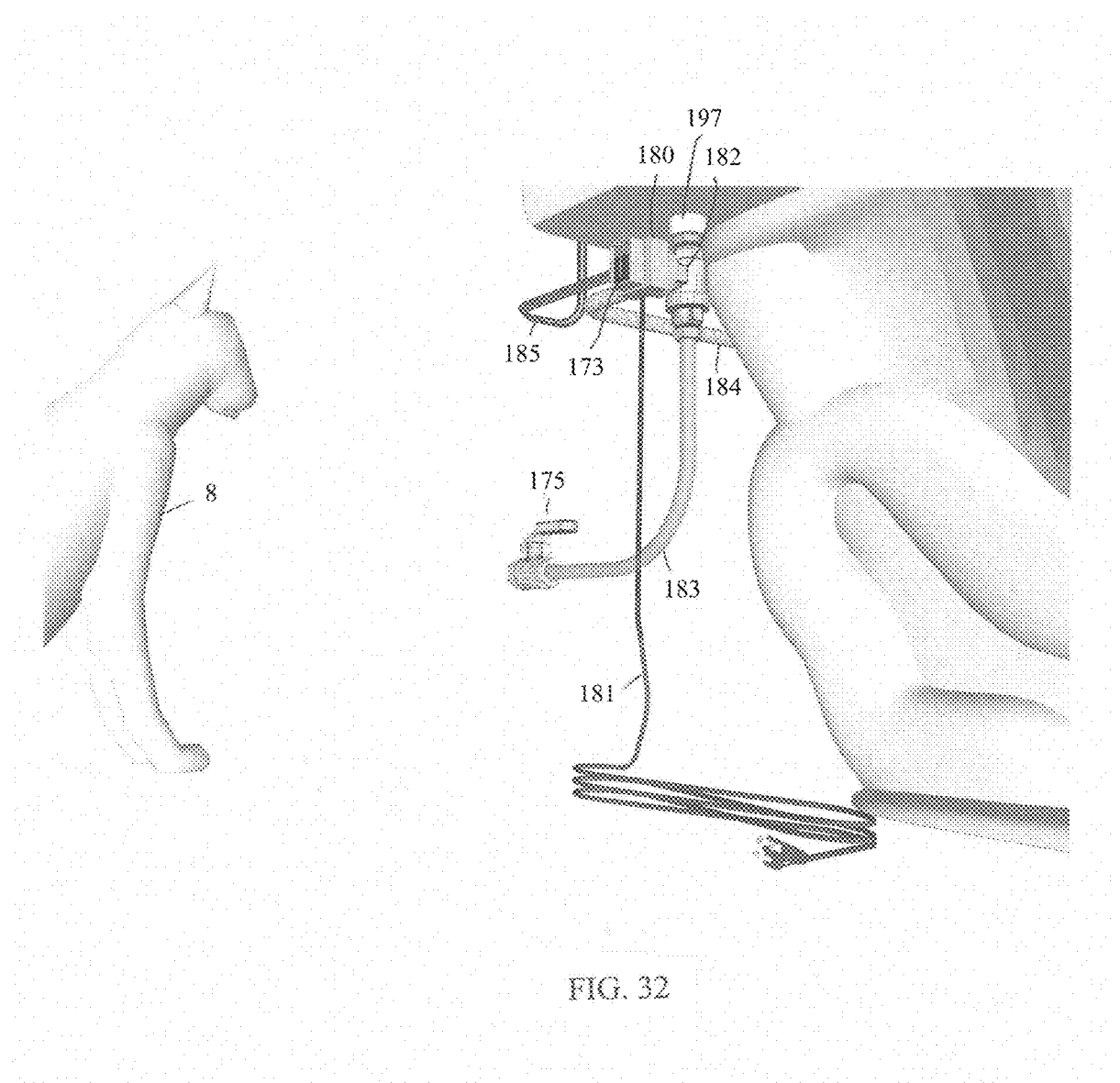
FIG. 32 is a lower left front perspective detail view of the embodiment of the invention shown in FIG. 27.

Further embodiments are shown in FIGS. 16 and 17 in which the weight of the pet causes the toilet to flush and thereby refresh the water in the pet water dish 162. Alternatively a pressure sensor pad or mat can be used to trigger the flush when the motion of a pet is sensed on step 176 or on panel 170 (FIG. 14, 15) or pad 100 (FIGS. 21-24) or on lid 14. Examples of suitable pressure pads or mats are those manufactured by Arun Electronics Ltd of West Sussex, UK, those sold under the trademark EVERSENSE, or catalogue #L5270 at dicksmith.com.au. Activation of the pressure mat causes a signal to be generated which causes a controller to trigger a flush or a valve to be opened as in the embodiment shown in FIG. 27. In FIG. 16 a step 176 is provided so that when a pet climbs onto the step 176, its weight will cause flush handle 166 to rotate and trigger the flushing mechanism. Step panel 176 is hingedly mounted on the lower ends of arms 177, 178 by hinges 179. In this way when seat lid 114 is raised, step 176 rotates to a vertical position, and when seat lid 114 is lowered, step 176 drops to the horizontal position shown in FIG. 16. Vertical arm 178 is hingedly connected to handle 166 and arm 177 is hooked over the upper edge of tank 12 which permits handle 166 to be rotated when weight is placed on step 176.

In the embodiment shown in FIG. 17, the weight of the pet again causes the toilet to flush and thereby refresh the water in the pet water dish 162, however in this case the toilet does not have a flush handle but rather uses a water conserving dual flush mechanism. In FIG. 17 a step 186 is provided so that when a pet climbs onto the step 186, its weight will cause the flushing mechanism to be triggered. Step 186 is hingedly mounted on the lower ends of vertical panel 188 by hinge 189. In this way when seat lid 114 is raised, step 186 rotates to a vertical position, and when seat lid 114 is lowered, step 186 drops to the horizontal position shown in FIG. 17. Vertical panel 188 is in turn connected to horizontal panel 190.

Figure 18:
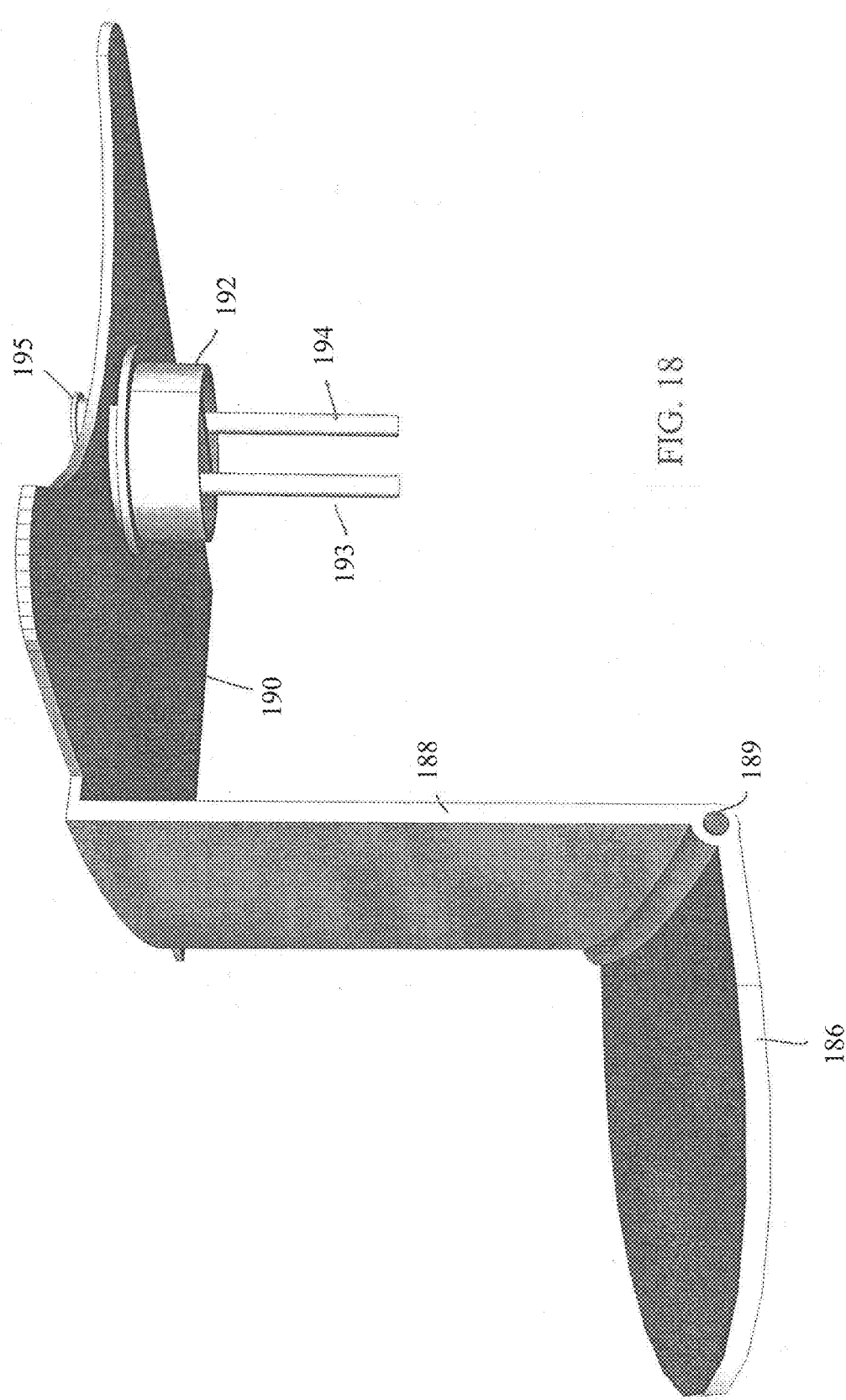
Figure 19:
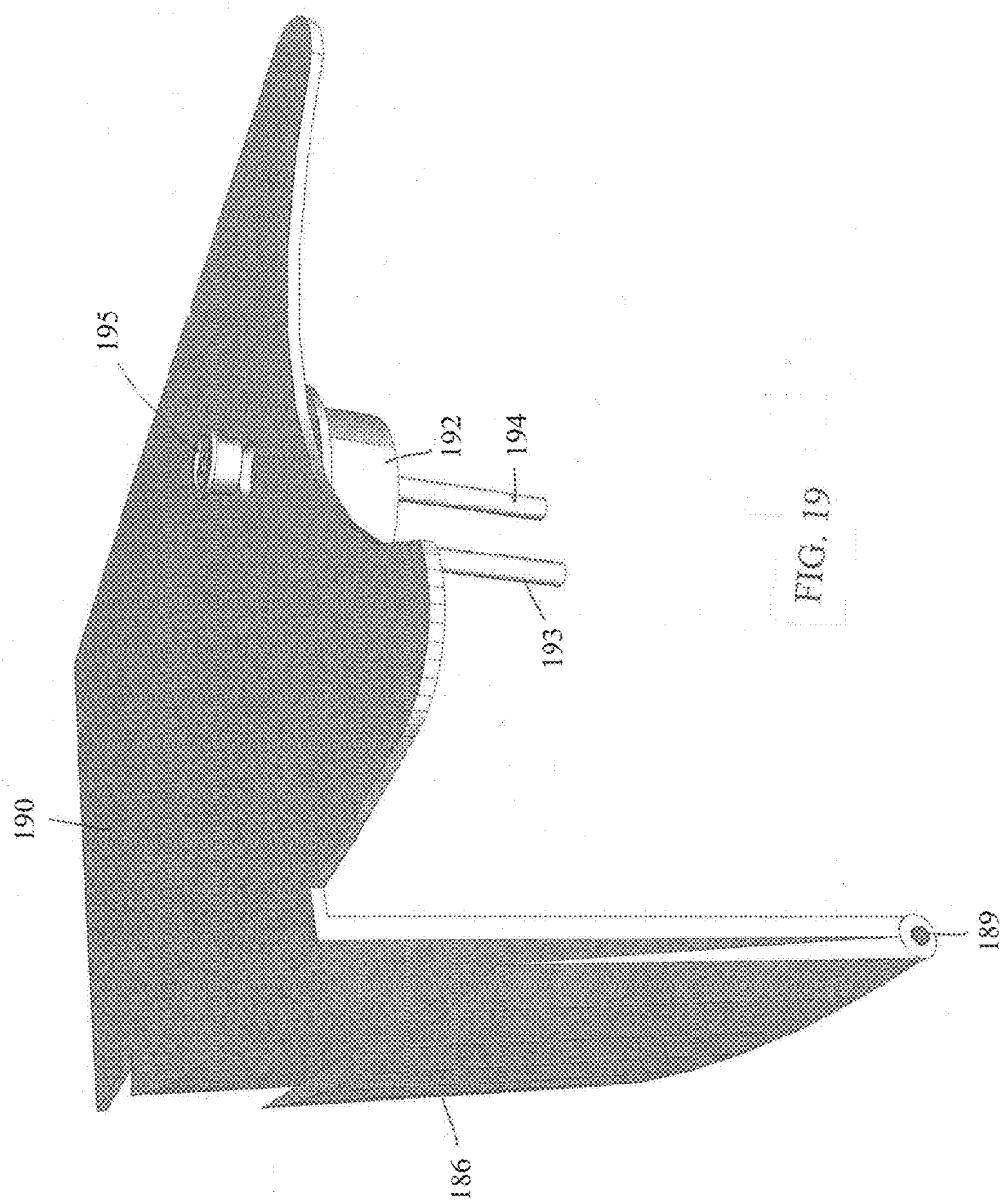
Figure 20:
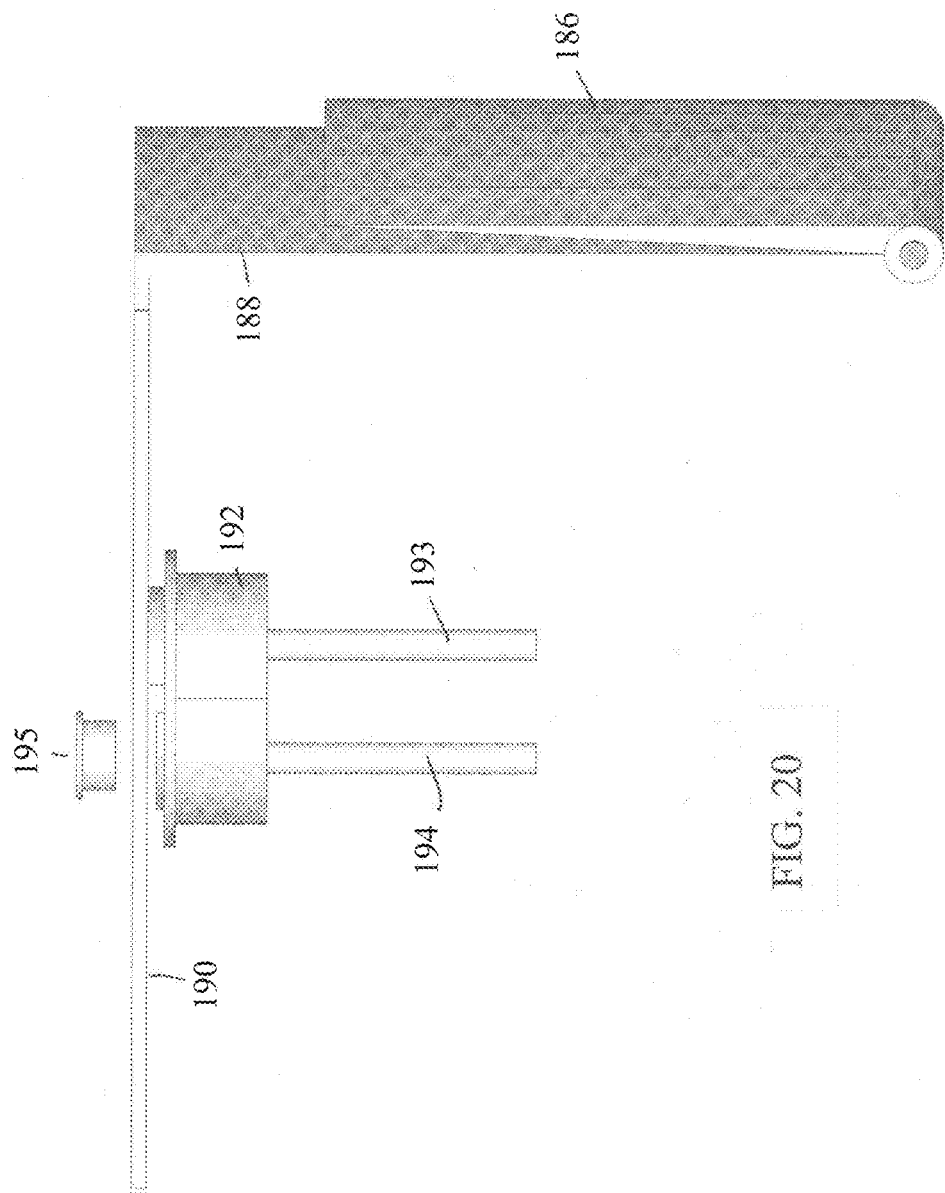

The flushing mechanism in the embodiment shown in FIG. 17 is shown in further detail in FIGS. 18, 19 and 20. Secured to the underside of panel 190 is a circular extension 192 which replaces the two semi-circular buttons in the dual flush control. Rods 193, 194 extend downwardly and activate the dual flush mechanism when panel 190 moves downwardly due to the weight of the pet on step 186.

Pressing the "Full" flush button 195 causes a full flush, intended for use by humans. Pressure down on panel 190 due to the pet's weight will only activate the "low flush" mechanism. Circular extension 192 may be provided in different sizes and shapes to fit different toilet types. Circular head 192 may also rotate through 360 degrees to accommodate different toilet types. Button 195 moves freely up and down and is not intended for pet use but rather to permit the full flush for human use while panels 186, 188 and platform 190 trigger the low flush either by the pet movement or weight or that of the human hand. By rotating circular head 192, pressure on panels 186 or 190 could also be set to cause a full flush instead of a low flush.

Figure 21:
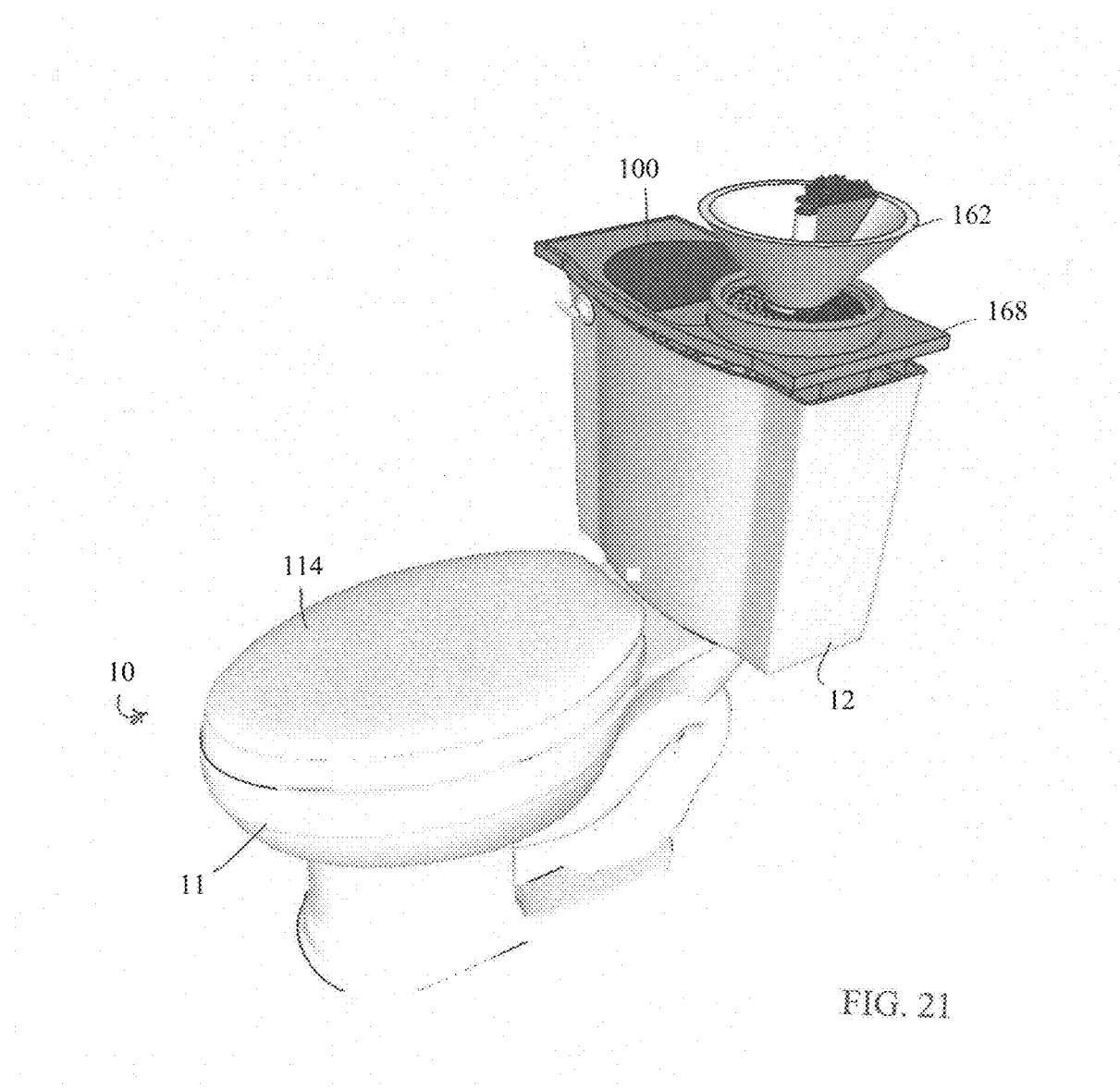
Figure 22:
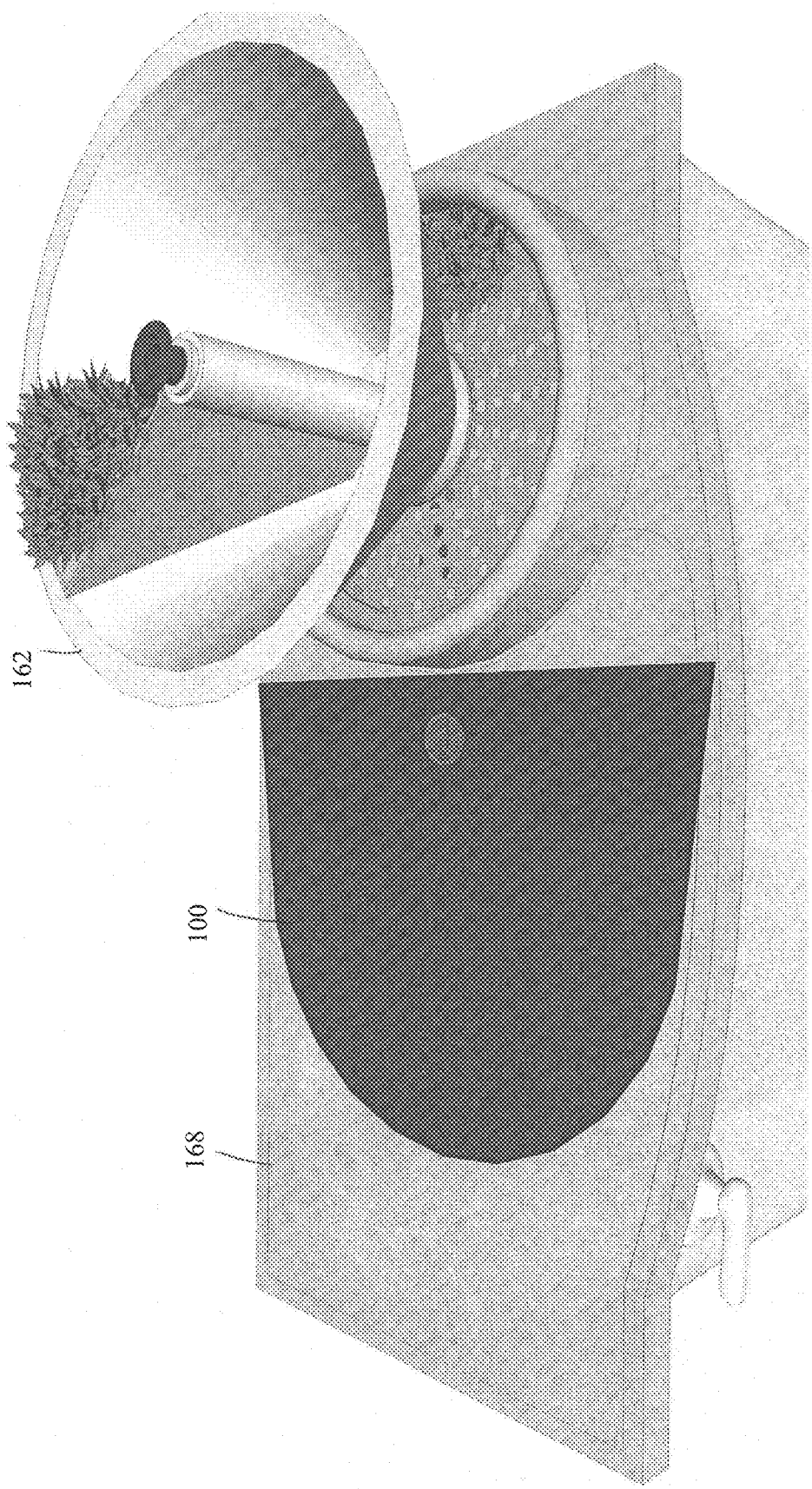
Figure 23:
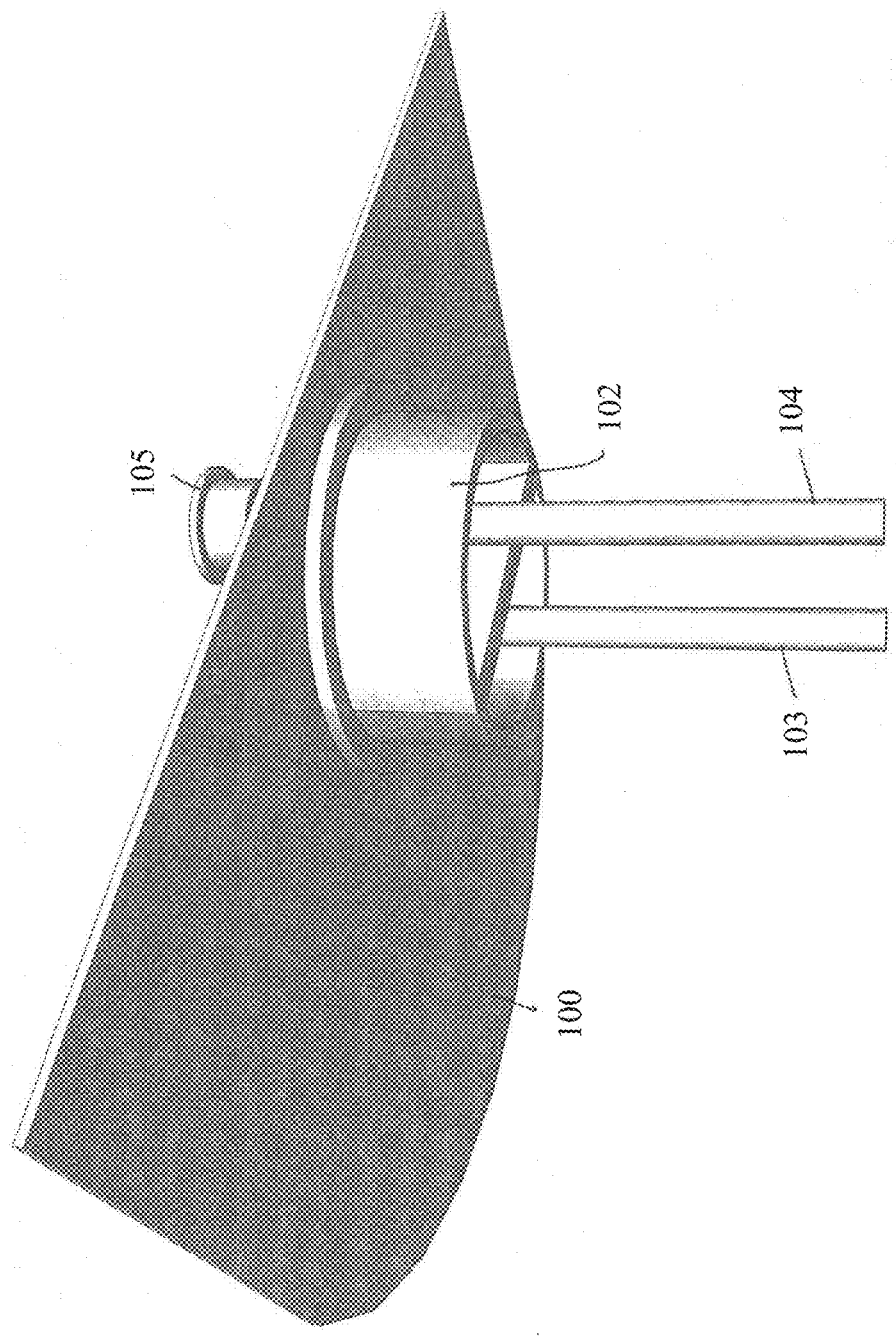
Figure 24:
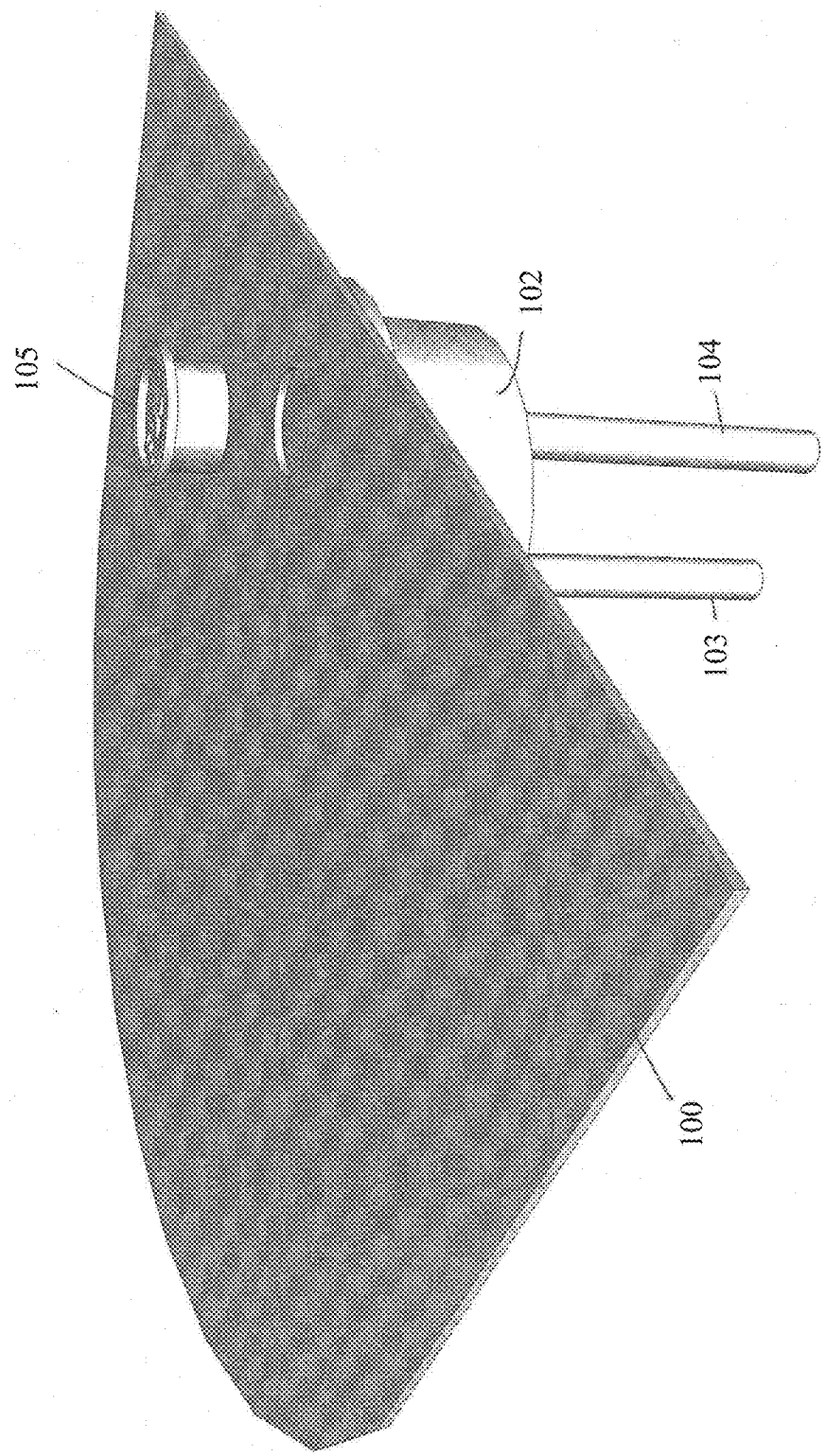

A further embodiment for use with a dual flush mechanism is shown in FIG. 21-24 in which the weight of the pet causes the toilet to flush and thereby refresh the water in the pet water dish 162. In FIGS. 21 and 22 a pressure pad 100 is provided on lid 168 so that when a pet climbs onto lid 168, its weight on pad 100 will cause the flushing mechanism to activate or an electronic valve 182 to open. The flushing mechanism in the embodiment shown in FIG. 21, 22 is shown in further detail in FIGS. 23 and 24. Secured to the underside of pad 100 is a circular extension 102 which replaces the two semi-circular buttons in the dual flush control. Rods 103, 104 extend downwardly and activate the dual flush mechanism when pad 100 moves downwardly due to the weight of the pet on pad 100. Pressing the "Full" flush button 105 causes a full flush, intended for use by humans. Pressure down on panel 100 due to the pet's weight will only activate the "low flush" mechanism.

Figure 25:
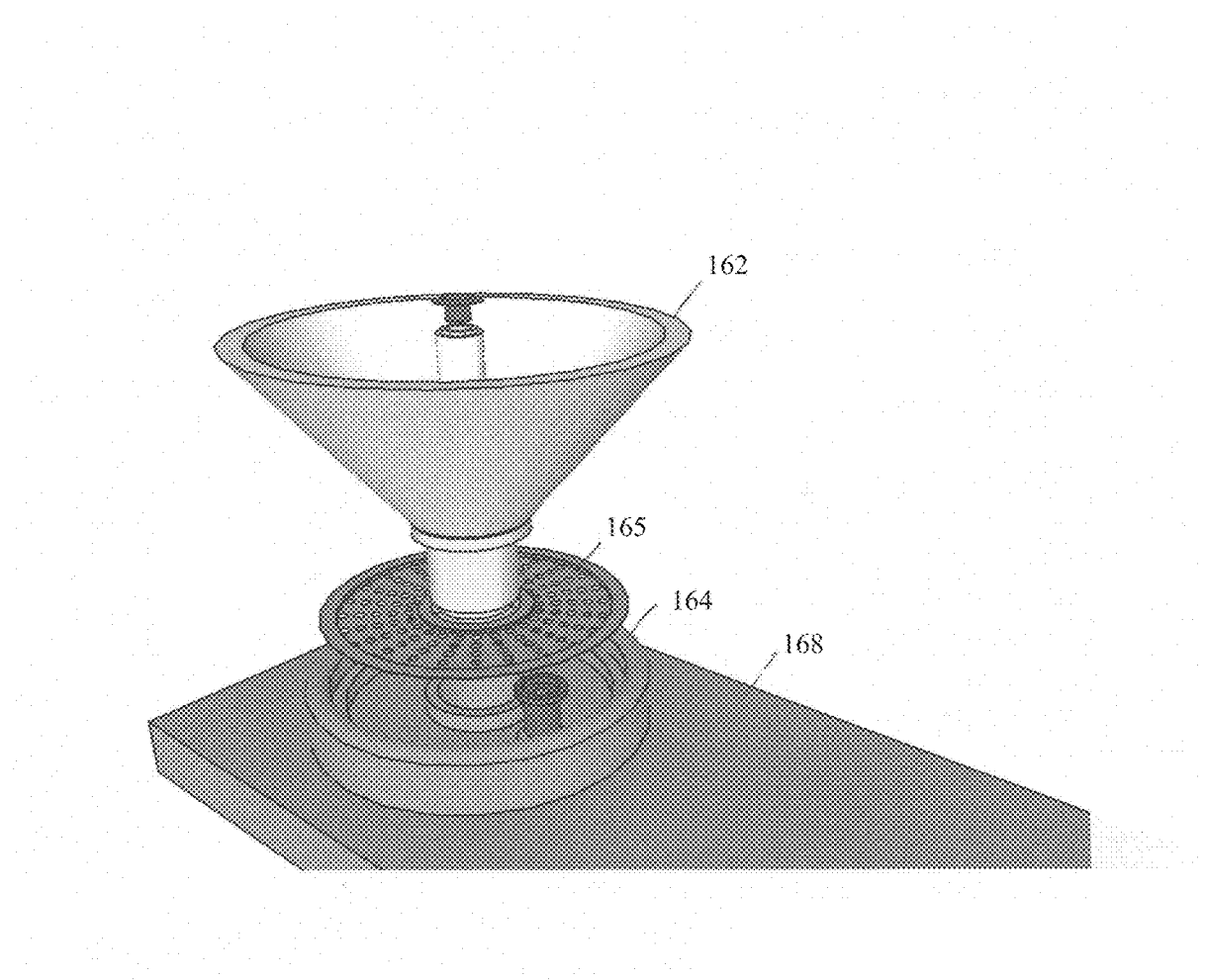
FIGS. 25 and 26 are perspective views of an embodiment in which the invention is also used to water plants.
Figure 26:
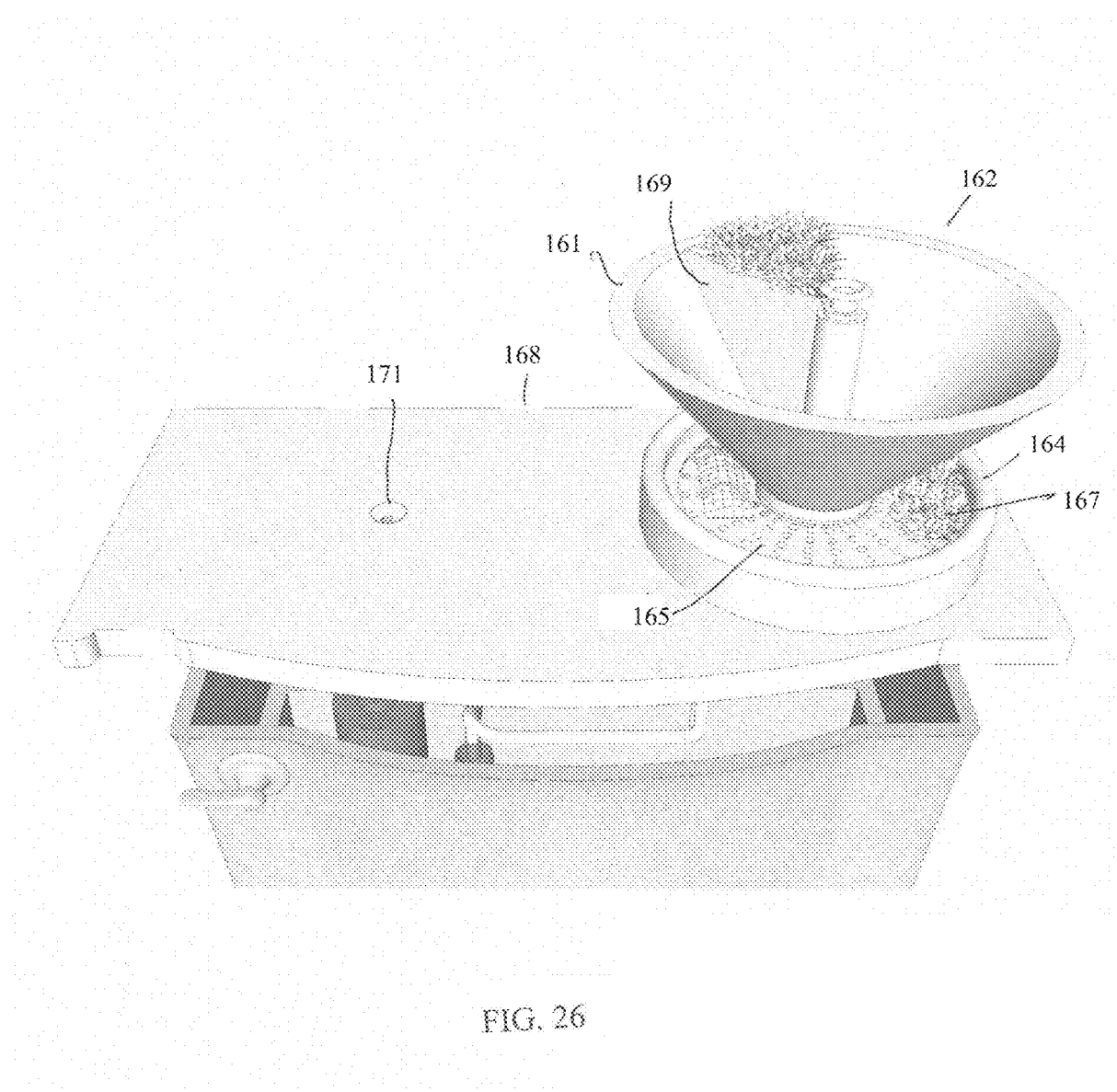

A further improvement is shown in FIGS. 25 and 26 in which a screen is added to the pet dish structure to allow the water supply to supply fresh water to plants, such as grass cultivating dishes. As shown in FIGS. 25 and 26 a screen 165 is added in reservoir 164 to support plants 167. Plants 167 are then watered whenever the toilet is flushed or electronic valve 182 opened. Also dishes 169 can be hung from the upper edge 161 of dish 162 so that the roots of the plants are supplied water from the surface of the water retained in dish 162. Such dishes 169 could be removably held in slots in edge 161, or could have a removable snap fit onto edge 161. Such dishes could contain an absorbent surface communicating with the water surface whereby plant seeds are kept above the water level but roots which are generated extend below the water line.

Figure 33:
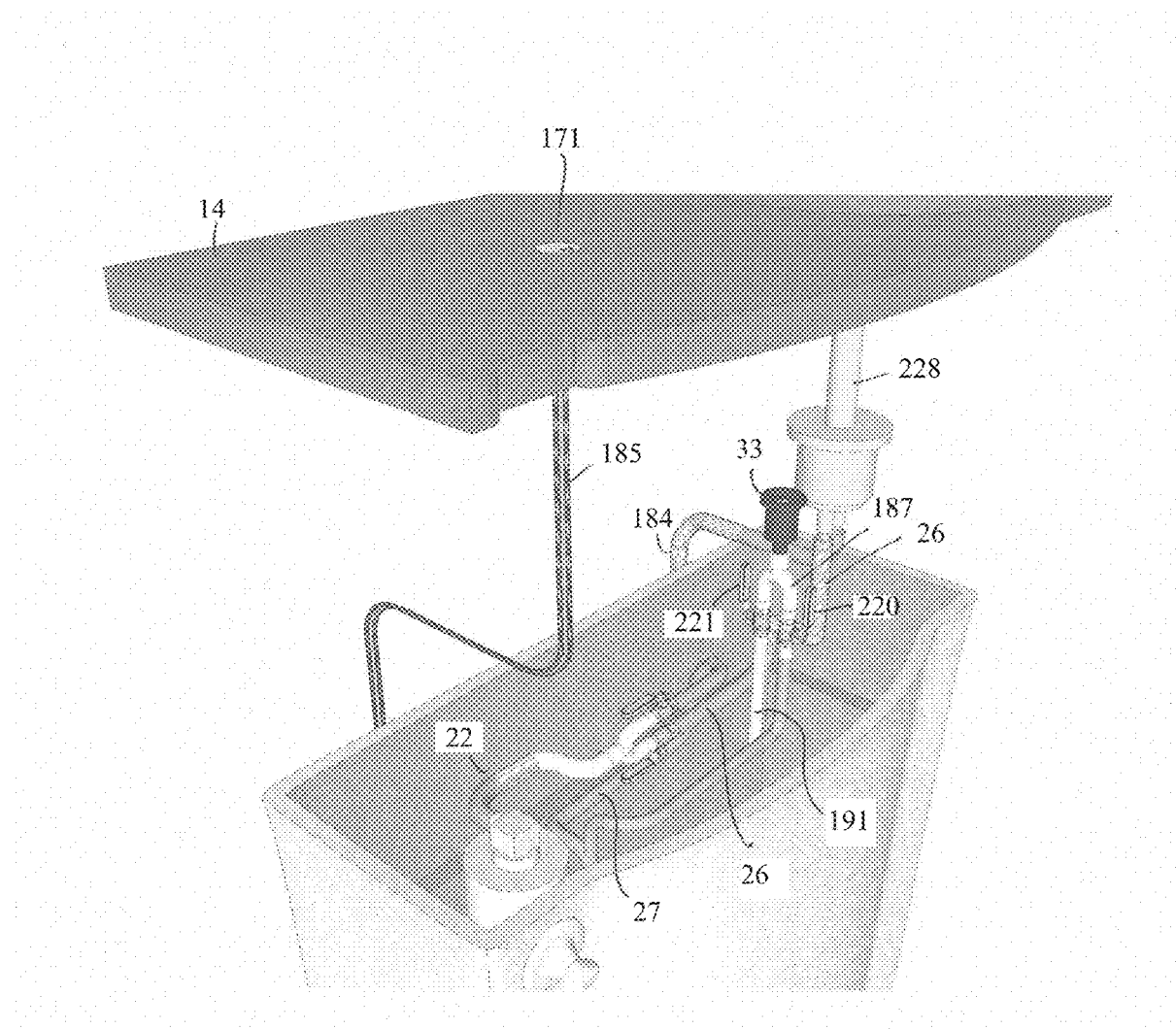
FIG. 33 is a top left front perspective detail view of the embodiment of the invention shown in FIG. 27.
Figure 34:
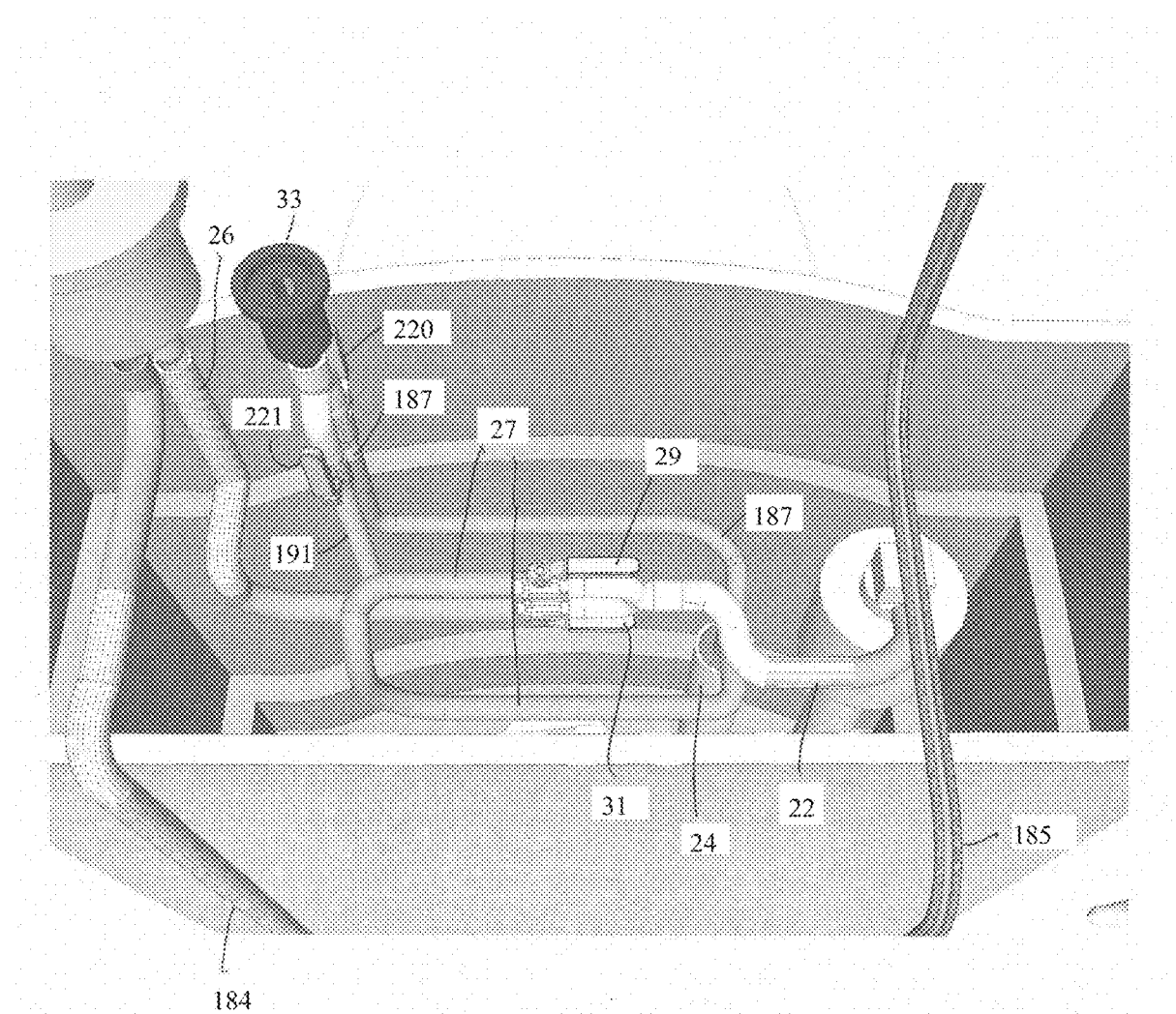
FIG. 34 is a top front perspective detail view of the embodiment of the invention shown in FIG. 27 with the adapter lid removed for ease of illustration.

A further embodiment is shown in FIG. 27-34 in which an electronic motion sensor 171 can be used in addition to or instead of the flush mechanism to refresh the water in the pet water dish 162. In this embodiment an electronic near-field infra-red sensor 171, powered through conductor 185 by an electrical source 181 from a wall outlet or battery 173, is positioned on the toilet 10 to sense the motion of an approaching pet 8. The infra-red sensor 171 can be either an active infra-red which sends out infra-red signals and detects motion according to the reflected signal, or passive infra-red sensors which only receive infra-red signals. Sensor 171 can be located on lid 14 to sense when the pet reaches lid 14 or other suitable location around the toilet to sense the approaching pet. Numerous models of suitable passive infra-re sensor are available. Suitable motion sensors which include the solenoid valve, wiring and electronics are also readily available as sensor faucet infrared sensors and for standard urinals and repair kits for urinals to provide motion sensors which control flow in the faucet or urinal. When the motion of an approaching pet 8 is sensed by motion sensor 171, a signal is sent through conductor 185 to controller 180 which causes valve 182 to be opened electronically to permit the flow of water through supply line 183 into line 184, which supplies water to the column 228 which supplies pet bowl 162 or other dispensing means (see FIG. 35-37) with water. Supply line 183 is opened and shut by valve 175. Water can be supplied to valve 182 through the existing connection 197 to the ballcock valve whereby when valve 182 is opened water flows into line 184 without interfering with the normal operation of the ballcock 20. A timer in controller 180 closes valve 182 after a pre-selected flow time. A delay can be programmed in controller 180 so that the water continues to run until a period of time after no presence of a pet is detected. Water can also be supplied to pet bowl 162 in addition when the flush mechanism is activated as described in the above embodiments, through supply line 26 which communicates with column 228. As shown in FIGS. 33 and 34, the water flow from refill tube 22 can be split into supply line 26 and return line 27 controlled by valves 29, 31. Return line 27 returns water to overflow tube 24. Outlet 33 receives water flowing from the pet dish 162 or other water dispensing means and it in turn communicates with lines 191 which returns water to the tank, and line 187 which returns water to overflow tube 24. Lines 187 and 191 are controlled by valves 220 and 221 so that the return flow can be directed into the tank or back to the overflow tube.

Figure 4:
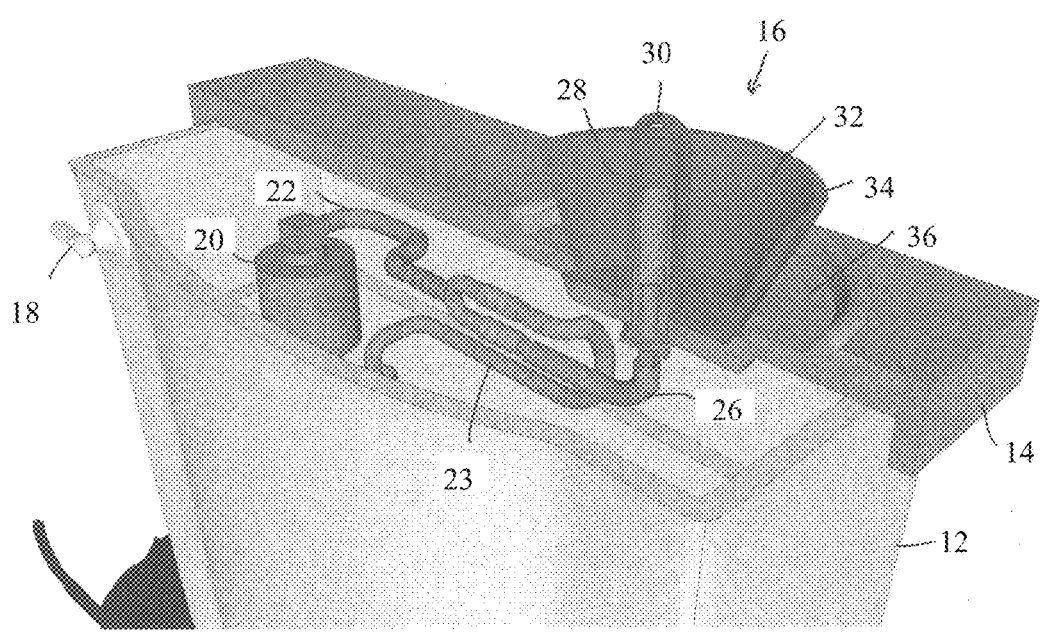
Figure 5:
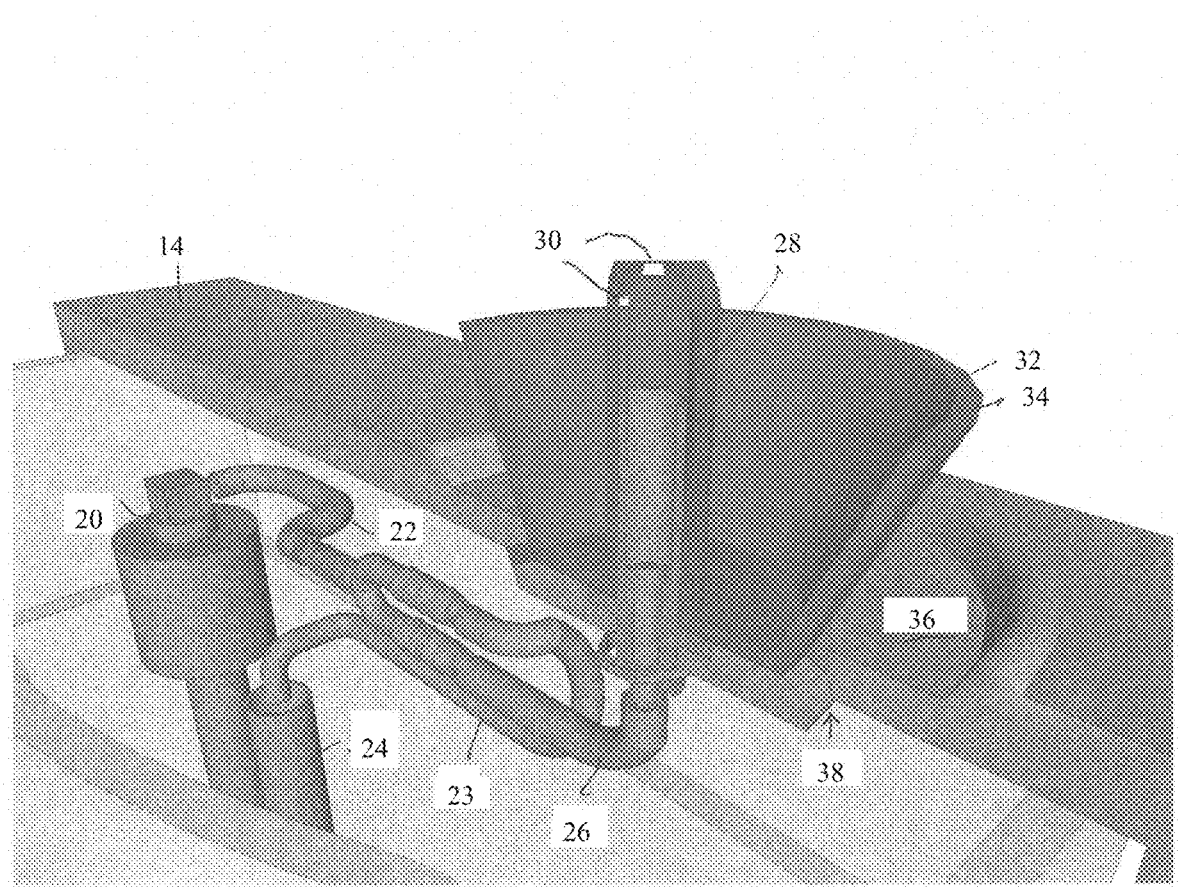
Figure 6:
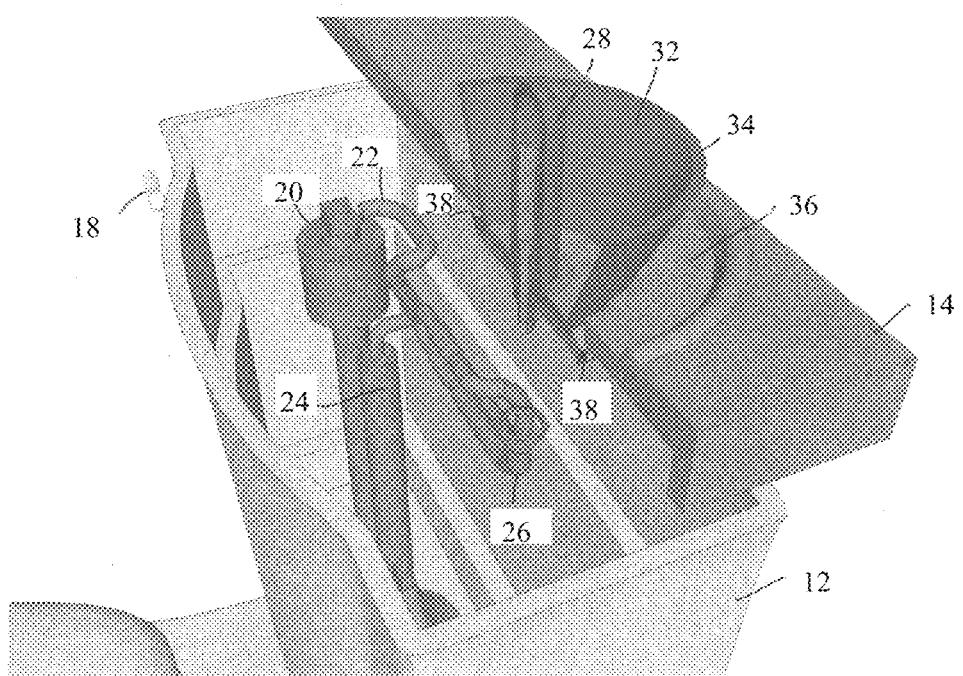
Figure 7:
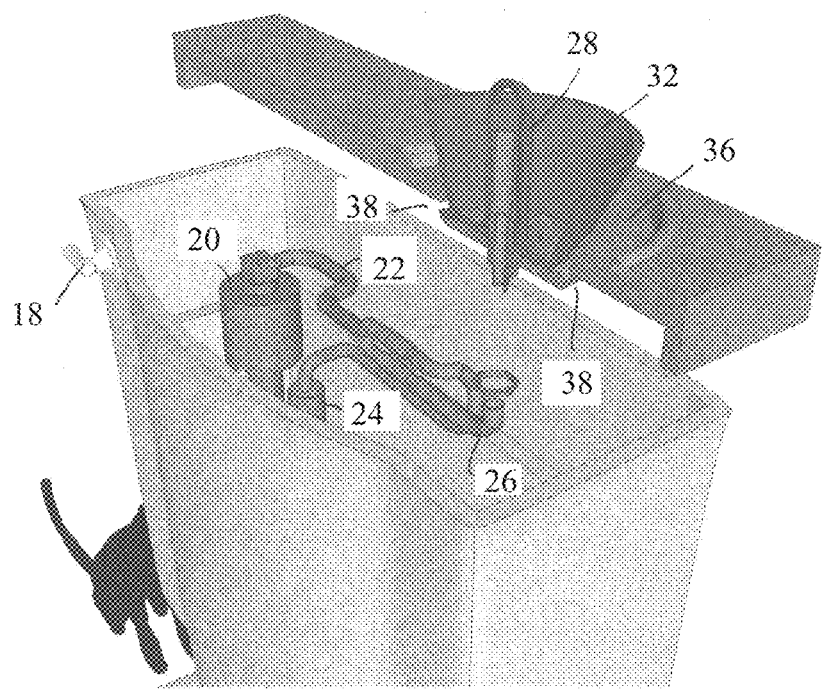
Figure 8:
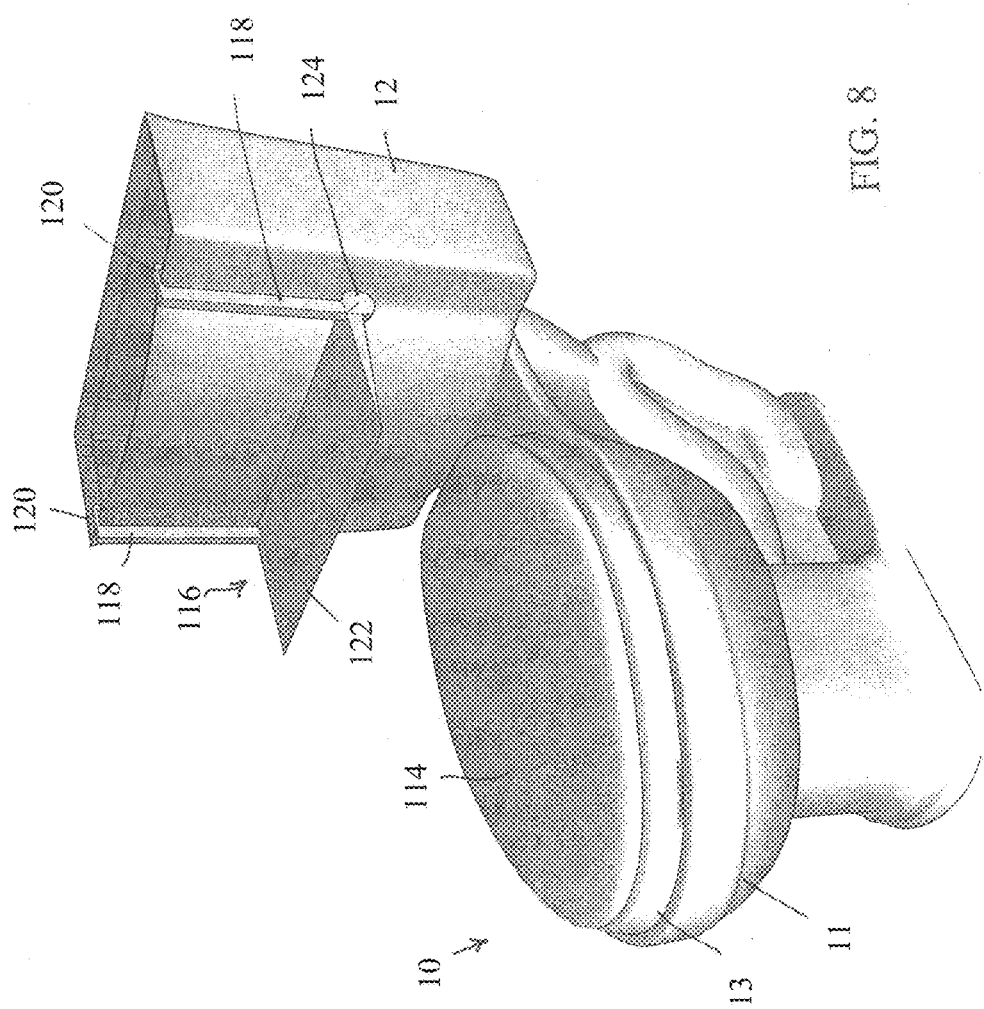
FIG. 8-11 are perspective views of step accessories for use with the applicant's adapter for a toilet system to create an automatically refreshed water supply for pets.

FIGS. 35, 36 and 37 illustrate alternatives to the use of the dish 16 shown in FIG. 4 for dispensing the water to the pet. In FIG. 35, a conical surface 300 is provided. When the flow of water up the column 28 is triggered either by activation of handle 18 or by pressure or motion sensors as described above, the water flows out aperture 330, filling conical depression 332 until it overflows over the conical surface 300 and flows into reservoir 36 and through apertures 38 and back into the tank 12. The pet may therefore lick water from the conical surface while the water is flowing. A pump may be provided in tank 12, cup 16 or reservoir 36 to maintain continuous flow of water.

In the alternative shown in FIG. 36, a fountain 340 is provided from which the water falls freely. When the flow of water up the column 328 is triggered either by activation of handle 18 or by pressure or motion sensors as described above, the water flows out aperture 342 falling directly onto surface 344 and flows through apertures 348 back into the tank 12. The pet may therefore drink from the flow of water below aperture 342 while the water is flowing. Continuous flow of water may be maintained by an electric pump in tank 12, cup 16 or reservoir 36.

In the alternative shown in FIG. 37, a fountain 350 is provided from which the water flows upwardly before falling freely to the lid below. When the flow of water up the column 358 is triggered either by activation of handle 18 or by pressure or motion sensors as described above, the water flows out aperture 352, falling directly onto surface 344 and flows through apertures 348 in lid 14 and back into the tank 12. The pet may therefore drink from the flow of water above the conical depression 354 while the water is flowing or the water may form a conical spout of water permitting the pet to drink directly from the fountain.

FIG. 38-40 illustrate an embodiment in which a pump 250 may also be provided to produce a constant flow of water to the water dispensing devices. Pump 250 has an external cylindrical filter 252 and is located to be immersed in the water in tank 12. Power is supplied to pump 250 through conductor 254 which is controlled by controller 180 (FIG. 38). Pump 250, when activated draws water from tank 12 and pumps it through pipe 256 to column 228 and then to the water dispensing device 162, 340 or 350. Controller 180 can be programmed to activate pump 250 whenever a signal is received sensing the approach of a pet, as described above and can supplement the volume or pressure of water supplied to the water dispensing device through solenoid valve 182. Pump 250 can therefore provide a continuous water flow to the water dispensing device as long as the pet is detected.

While a number of exemplary aspects and embodiments have been discussed above, those of skill in the art will recognize certain modifications, permutations, additions and sub-combinations thereof. It is therefore intended that the invention be interpreted to include all such modifications, permutations, additions and sub-combinations as are within their true spirit and scope.

What is claimed is:

1. An apparatus for utilizing a toilet connected to an external supply of water to provide a fresh water supply for pets, comprising means to divert water during a flush cycle of said toilet from the external water supply of the toilet to a water dispensing element accessible to a pet, said water dispensing element comprising a water-retaining receptacle exterior to and mounted on a water storage portion of said toilet which fills to a predetermined level, with excess water from the water-retaining receptacle after said predetermined level is reached being returned to the water storage portion of said toilet and water below said predetermined level being retained in said water-retaining receptacle;

wherein said water-retaining receptacle comprises an upwardly opening water-retaining basin comprising an upper edge, said upwardly opening water-retaining basin being mounted to an exterior surface of said water storage portion of said toilet and which receives said water diverted from the external water supply of the toilet and fills to said predetermined level during said flush cycle of said toilet, and wherein water received by said water-retaining basin which exceeds said predetermined level flows by way of one or more channels into said water storage portion of said toilet with water received by said water-retaining basin below said predetermined level remaining in said water-retaining basin for access by said pet for consumption after said flush cycle has completed, and wherein said predetermined level is defined by said upper edge of said upwardly opening water-retaining basin, and wherein said water which exceeds said predetermined level flows radially outwardly over said upper edge of said upwardly opening water-retaining basin and downwardly into an intermediate basin arranged concentrically with said water-retaining basin and thereafter flows by gravity from said intermediate basin through said one or more channels into said water storage portion of said toilet.

2. The apparatus of claim 1 wherein said means to divert water from the water supply of the toilet comprises means to divert at least some of the water from said flush cycle of the toilet.

3. The apparatus of claim 2 further comprising means to trigger said flush cycle in said toilet to divert water to said water dispensing element.

4. The apparatus of claim 3 wherein said means to trigger said flush cycle to divert water comprises a controller to trigger said flush cycle to divert water from the water supply of the toilet to said water dispensing element.

5. The apparatus of claim 4 comprising pressure sensing means to provide a signal to said controller to trigger the flush cycle when the presence of a pet is sensed.

6. The apparatus of claim 4 comprising motion sensing means to provide a signal to said controller to trigger the flush cycle when the presence of a pet is sensed.

7. The apparatus of claim 2 further comprising means for triggering the flush cycle by the motion or weight of the pet.

8. The apparatus of claim 7 wherein said means for triggering the flush cycle by the motion or weight of the pet comprises triggering means connected to the flush handle of the toilet.

9. The apparatus of claim 8 wherein said triggering means connected to the flush handle of the toilet comprises a hinged panel configured to trigger said flush handle when the pet stands on said panel.

10. The apparatus of claim 7 wherein said means for triggering a flush cycle by the motion or weight of the pet comprises a pressure sensor connected to a lid of said water storage portion of said toilet.

11. The apparatus of claim 1 wherein said means to divert water during said flush cycle of said toilet from the external water supply of the toilet comprises a valve to divert water from said external water supply to said water dispensing element accessible to the pet.

12. The apparatus of claim 11 further comprising motion sensing means in communication with a controller for opening said valve upon sensing the motion of the pet.

13. The apparatus of claim 1 wherein said upwardly opening water-retaining basin is a dish which fills to said predetermined level which is defined by an upper edge of said dish, and wherein said water which exceeds said predetermined level flows by way of said one or more channels into said water storage portion of said toilet.

14. The apparatus of claim 1 wherein at least a portion of said upper edge of said upwardly opening water-retaining basin over which said water which exceeds said predetermined level flows radially outwardly is a uniform horizontal upper edge.

15. The apparatus of claim 14 wherein an entire upper edge of said upwardly opening water-retaining basin over which said water which exceeds said predetermined level flows radially outwardly is a uniform horizontal upper edge.

16. The apparatus of claim 14 wherein the upper edge of said upwardly opening water-retaining basin over which said water which exceeds said predetermined level flows radially outwardly comprises a slot or aperture in a side of said basin.

17. An apparatus for utilizing a toilet connected to an external supply of water to provide a fresh water supply for pets, comprising means to divert water during a flush cycle of said toilet from the external water supply of the toilet to a water dispensing element accessible to a pet, said water dispensing element comprising a water-retaining receptacle exterior to and mounted on a water storage portion of said toilet which fills to a predetermined level, with excess water from the water-retaining receptacle after said predetermined level is reached being returned to the water storage portion of said toilet and water below said predetermined level being retained in said water-retaining receptacle;

wherein said water-retaining receptacle comprises an upwardly opening water-retaining basin comprising an upper edge, said upwardly opening water-retaining basin being mounted to an exterior surface of said water storage portion of said toilet and which receives said water diverted from the external water supply of the toilet and fills to said predetermined level during said flush cycle of said toilet, and wherein water received by said water-retaining basin which exceeds said predetermined level flows by way of one or more channels into said water storage portion of said toilet with water received by said water-retaining basin below said predetermined level remaining in said water-retaining basin for access by said pet for consumption after said flush cycle has completed, and wherein said predetermined level is defined by said upper edge of said upwardly opening water-retaining basin, at least a portion of said upper edge is uniformly horizontal, and wherein said water which exceeds said predetermined level flows radially outwardly over said uniformly horizontal portion of said upper edge of said upwardly opening water-retaining basin and downwardly into an intermediate receptacle and thereafter flows by gravity from said intermediate receptacle through said one or more channels into said water storage portion of said toilet; and wherein said intermediate receptacle is arranged concentrically with said water-retaining basin.

18. The apparatus of claim 17 wherein an entire upper edge of said upwardly opening water-retaining basin over which said water which exceeds said predetermined level flows radially outwardly is a uniform horizontal upper edge.

19. The apparatus of claim 17 wherein the upper edge of said upwardly opening water-retaining basin over which said water which exceeds said predetermined level flows radially outwardly comprises a slot or aperture in a side of said basin.

* * * * *